(12) United States Patent
Inoue et al.

(10) Patent No.: US 7,560,851 B2
(45) Date of Patent: Jul. 14, 2009

(54) DYNAMOELECTRIC MACHINE AND MANUFACTURING METHOD THEREFOR

(75) Inventors: Masaya Inoue, Tokyo (JP); Kanji Shinkawa, Tokyo (JP); Shinji Nishimura, Tokyo (JP); Hiroyuki Akita, Tokyo (JP); Toshiyuki Yoshizawa, Tokyo (JP); Moriyuki Hazeyama, Tokyo (JP); Norihiro Murata, Tokyo (JP); Masao Morita, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 12/141,370

(22) Filed: Jun. 18, 2008

(65) Prior Publication Data

US 2008/0315701 A1    Dec. 25, 2008

(30) Foreign Application Priority Data

Jun. 20, 2007 (JP) ............................. 2007-162264
Aug. 17, 2007 (JP) ............................. 2007-212991
Aug. 17, 2007 (JP) ............................. 2007-212992

(51) Int. Cl.
H02K 1/22 (2006.01)
(52) U.S. Cl. .................................. 310/263; 310/156.72
(58) Field of Classification Search .................. 310/263, 310/156.66–156.69, 156.71, 156.72, 156.73
See application file for complete search history.

(56) References Cited

U.S. PATENT DOCUMENTS 5,543,676 A * 8/1996 York et al. .................. 310/263
5,907,209 A * 5/1999 Ishida ......................... 310/263

FOREIGN PATENT DOCUMENTS

JP    10-136623    5/1998
JP    2003-18808   1/2003

OTHER PUBLICATIONS

U.S. Appl. No. 12/141,370, filed Jun. 18, 2008, Inoue et al.

(Continued)

*Primary Examiner*—Dang D Le
(74) *Attorney, Agent, or Firm*—Oblon, Spivak, McClelland, Maier & Neustadt, P.C.

(57) ABSTRACT

A dynamoelectric machine includes: a permanent magnet holding portion that is disposed integrally so as to project from the yoke portion on a portion of the pair of yoke portions that faces an inner circumferential surface near a tip end of the plurality of claw-shaped magnetic pole portions; an arc-shaped magnet holding aperture that has a C-shaped cross section that is formed in each of the permanent magnet holding portions so as to have an aperture center that is oriented axially, in which at least one axial end is open, and that opens radially outward; a magnet holding member that is made of a nonmagnetic material that is fitted into and held by the magnet holding aperture; and a permanent magnet that is held by the magnet holding member so as to face the inner circumferential surface near the tip end of the claw-shaped magnetic pole portions, that is prepared into a prismatic body that has a quadrilateral cross section perpendicular to an axial direction, and that is magnetically oriented in a reverse direction to an orientation of a magnetic field produced by the field coil.

14 Claims, 21 Drawing Sheets

OTHER PUBLICATIONS

U.S. Appl. No. 12/165,934, filed Jul. 1, 2008, Shinkawa et al.
U.S. Appl. No. 12/141,370, filed Jun. 18, 2008, Inoue, et al.
U.S. Appl. No. 12/189,387, filed Aug. 11, 2008, Morita, et al.

* cited by examiner

33(37)

FIG. 6
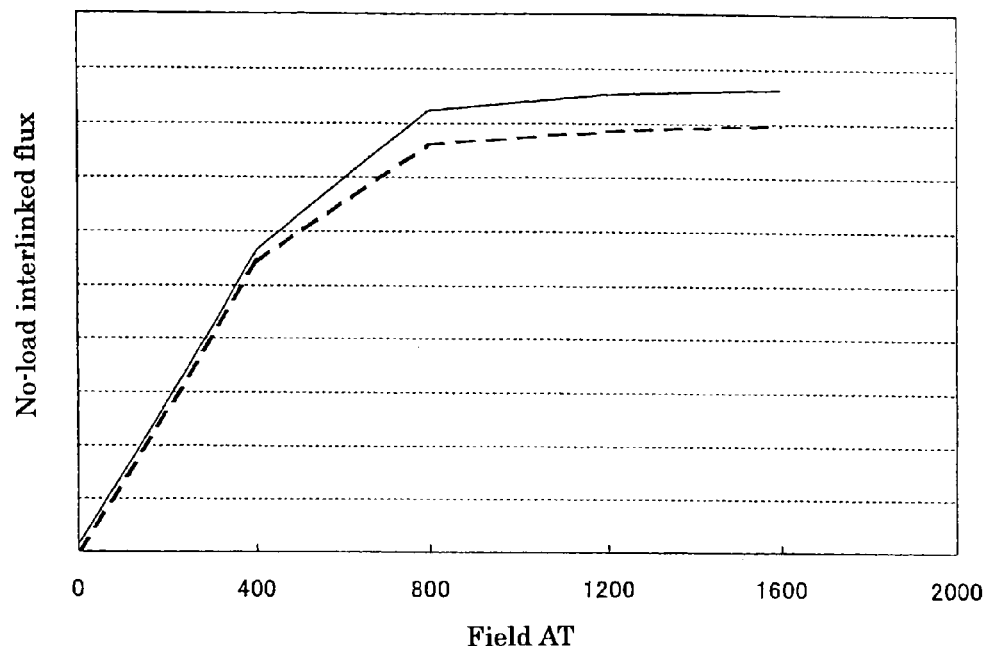
FIG. 7
| Alternator Rotation Frequency (rpm) | Conventional Device Generated Power (A) | Present Invention Generated Power (A) |
|---|---|---|
| 1300 | 34 | 60 |
| 2000 | 113 | 130 |
| 5000 | 160 | 165 |
FIG. 8
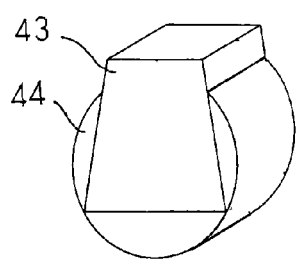

DYNAMOELECTRIC MACHINE AND MANUFACTURING METHOD THEREFOR

BACKGROUND OF THE INVENTION

1. Field of the Invention

The present invention relates to a dynamoelectric machine such as an automotive alternator, etc., and particularly relates to a Lundell rotor construction to which permanent magnets are mounted and to a manufacturing method therefor.

2. Description of the Related Art

Automotive alternators that use Lundell rotors have been used in automobiles for decades. Loads from electrical equipment that has been mounted due to environmental issues have increased rapidly in recent years, and further increases in generated power have been sought from Lundell rotors.

If attempts are made to answer these demands within the scope of conventional design, the alternators are invariably increased in size. Increases in alternator size are undesirable since the weight of and space occupied by such alternators is increased. Increases in alternator size are also known to give rise to new problems such as leading to increased rotor inertia, and engine speed fluctuations and alternator inertial torque interacting and leading to belt vibration and slippage.

Consequently, there is demand to increase alternator capacity while maintaining alternator main body size in its present state.

Conventionally, means of disposing permanent magnets between claw-shaped magnetic poles that face each other circumferentially in a Lundell rotor have been adopted in order to solve such problems (see Patent Literature 1 and 2, for example).

In addition, examples of magnet mounting methods include: methods in which U-shaped magnets are held on claw-shaped magnetic poles by being fitted onto claw tips of the claw-shaped magnetic poles (see Patent Literature 3, for example), or methods in which a ring-shaped magnet is disposed on an outer circumferential portion of a cylindrical field coil that has been wound onto a boss portion of a rotor core, and the magnet is held by claw-shaped magnetic poles (see Patent Literature 4, for example).

Thus, various methods for holding permanent magnets have been proposed in conventional automotive alternators, but for these permanent magnet holding methods to be of practical use, it is necessary to: (1) increase permanent magnet holding reliability; (2) suppress induced voltages during no-load de-energization; and (3) avoid thermal demagnetization of the magnets by high-frequency magnetic fields that are induced by stator slots.

Each of these factors will now be explained.

(1) Permanent Magnet Holding Strength

In automotive alternators, rotors rotate at high speeds in a vicinity of up to 18,000 to 20,000 rpm when driven by torque that is transmitted from an engine by means of belts and pulleys. Because of this, even if small magnets that weight only a few grams per pole are installed, extremely large centrifugal forces that exceed several tens of kilogram force act on the magnets.

In answer to this, conventional magnet holding methods have attempted to hold the centrifugal forces that act on the magnets using the claw-shaped magnetic poles themselves. In these magnet holding methods, it is necessary to finish abutted surfaces of both the magnets and the claw portions with extremely high precision so as to place the two in a state of surface contact. In other words, if the two are placed in point contact, local stresses may be concentrated on the magnets, and the magnets may be damaged. Because raising magnet processing precision is difficult in mass-produced products, it is also possible to consider means for ensuring external shape precision of the magnets using SUS plates or resin molds instead, but these lead to enormous costs.

To facilitate installation of field coils, pole cores are divided axially into two interfitting sections, and it is also necessary to increase interfitting precision. Realistically, ensuring such parts precision increases costs significantly during mass production of rotors.

In addition, even if static shape precision is adapted in this manner, magnet holding in automotive alternators is still difficult.

Specifically, since automotive alternators are disposed in engine compartments, they may be placed in high-temperature environments that are several tens of degrees above one hundred degrees Celsius, generating displacements of several tens of μm due to thermal expansion or contraction.

Large centrifugal forces also act on the claw-shaped magnetic poles even when not holding magnets, and the claw tip portions expand approximately 50 to 100 μm radially outward. Thus, the claw-shaped magnetic poles are displaced so as to flap with increases and decreases in engine rotational speed. Since the claw-shaped magnetic poles have a cantilever beam construction, displacement is greater at tip end portions, smaller at claw root end portions, and distances between adjacent claw-shaped magnetic poles also change.

Consequently, if attempts are made to hold the magnets using uniform surfaces despite the presence of such dynamic thermal and centrifugal displacements of the claw-shaped magnetic poles, a great deal of adaptation is required in the magnet holding construction.

Because magnet main bodies or covers that protect the magnets slide and abrade due to displacement of the claw-shaped magnetic poles, it is necessary to ensure reliability of strength for a long time.

Because of these facts, the current situation is such that much further adaptation is required in order to resist the centrifugal forces that act on the magnets and hold the magnets on the claw-shaped magnetic poles, and it is desirable that the magnets be held somewhere other than by the claw-shaped magnetic poles. A first conventional improved magnet holding construction has been proposed in which magnets are held inside first and second pockets that are formed integrally on first and second fans, the first fan being mounted onto a first pole piece by press-fitting the first pocket between an upper surface of a body of the first pole piece and lower surfaces of pole fingers of a second pole piece, and the second fan being mounted onto the second pole piece by press-fitting the second pocket between an upper surface of a body of the second pole piece and lower surfaces of pole fingers of the first pole piece (see Patent Literature 5, for example).

In the first conventional improved magnet holding construction, the pockets that hold the magnets are formed so as to have an approximately rectangular cross-sectional shape that conforms to an interfitting space between the body of one pole piece and the pole fingers of the other pole piece. In order to firmly hold the pockets that hold the magnets, it is necessary to machine the interfitting surfaces of the pole pieces with high precision. However, the surfaces of the pole pieces that fit together with the pockets are flat surfaces or gently curved surfaces, and after-processing of the pole pieces by high-performance machine tools is required, requiring huge machining costs and machining time. Because the first conventional improved magnet holding construction is a construction in which the centrifugal forces that act on the magnets are held by the claw-shaped magnetic pole portions, tip ends of the claw-shaped magnetic pole portions are displaced radially outward during high-speed rotation, and stable holding of the magnets cannot be achieved.

Thus, in order to avoid the effects on magnet holding of relative displacement between the magnets and the claw-shaped magnetic poles, a second conventional improved magnet holding construction has been proposed in which magnets that are magnetized radially are disposed on an outer circumferential side of a yoke portion on axial end portions of a Lundell pole core (see Patent Literature 6, for example).

(2) Induced Voltages During No-Load De-Energization

However, the above-mentioned second conventional improved magnet holding construction has problems of induced voltage during no-load de-energization.

In the second conventional improved magnet holding construction, because the magnets are disposed in a vicinity of a surface of the rotor, main magnetic flux or leakage flux from the magnets may have components that cannot be kept inside the rotor and that interlink directly with the stator.

The design is such that magnetic flux leakage levels generate magnetic flux approximately equivalent to one or two volts in an engine idling region at approximately 500 rpm. However, since automotive engines have a variable speed range of approximately 1:10, if, for example, the maximum engine speed is ten times that of idling, the one- or two-volt induced voltages from the magnets may exceed the system voltage of the vehicle and have adverse effects on other on-board equipment. To suppress this, a "reverse field" is required in which the field power source is polarized, and the field current flow is made to flow in reverse at high speeds to weaken the magnetic flux. One problem is that when the direction of flow of the current becomes bidirectional instead of unidirectional, a bidirectional circuit that incorporates an H-bridge is required instead of simple chopper control, increasing the number of components, and raising product costs. Furthermore, unlike a normal field, it is necessary to start this reverse field swiftly in response to increases in engine speed, but since a coil that has a high impedance of several hundred turns is used so as to be able to control the field using a small current of approximately several amperes, it is currently difficult to make the reverse field current flow instantaneously. If the number of field turns is reduced in order to avoid this, new problems arise such as the electric current value of the control power source itself also being increased, increasing control element capacity, and raising product costs.

(3) Demagnetization of Magnets Due to High-Frequency Magnetic Fields Induced by Stator Slots Having frequency components that are a product of the number of stator slots times rotational frequency per second, slot harmonic magnetic flux is a high-frequency magnetic field of two to three kilohertz. Under such conditions, if the magnets are held between the claw-shaped magnetic poles, or if U-shaped magnets are fitted onto and held by the tip ends of the claw-shaped magnetic poles, portions of the magnets or magnet holding metal fittings are exposed on the rotor surface facing the stator. These exposed magnets or magnet holding metal fittings are heated by induction by the high-frequency magnetic field due to slot harmonics. One problem is that if even a portion of a magnet is heated by induction and reaches a high temperature locally, heat will transfer to the entire magnet, the magnet will be thermally demagnetized.

Portions of the magnets or magnet holding metal fittings are also exposed on the rotor surface facing the stator in the second conventional improved magnet holding construction, making thermal demagnetization of the magnets similarly problematic.

Patent Literature 1: Japanese Patent Laid-Open No. SHO 61-85045 (Gazette)
Patent Literature 2: U.S. Pat. No. 4,959,577 (Specification)
Patent Literature 3: U.S. Pat. No. 5,543,676 (Specification)
Patent Literature 4: Japanese Patent Laid-Open No. 2002-136004 (Gazette)
Patent Literature 5: Japanese Patent Publication No. 2002-527015 (Gazette)
Patent Literature 6: Japanese Patent Laid-Open No. 2004-153994 (Gazette)

Thus, in order to hold permanent magnets on a Lundell pole core, it is necessary to increase permanent magnet holding reliability, to suppress induced voltages during no-load de-energization, and to avoid thermal demagnetization of the magnets by high-frequency magnetic fields that are induced by stator slots.

However, since the conventional magnet holding constructions described above do not achieve sufficient countermeasures against these three problems, they do not make any practical contribution.

SUMMARY OF THE INVENTION

The present invention aims to solve the above problems and an object of the present invention is to provide a dynamoelectric machine that has the characteristics described below, and to a method of manufacture therefor:

(1) Magnet holding is facilitated, and neither displacement of claw tips, which changes greatly relative to centrifugal forces in particular, nor relative displacement between the claws affect magnet holding directly;

(2) In automotive alternators, which have wide temperature ranges, axial displacement among the claws relative to thermal expansion of the shaft and the rotor does not affect magnet holding directly;

(3) Induced voltages during no-load de-energization are less likely to occur even if magnet volume is increased considerably;

(4) Induction heating is less likely to occur due to encroaching stator slot harmonic magnetic flux; and (5) Increases in moment of inertia due to the addition of magnets and magnet holding materials are small.

In order to achieve the above object, according to one aspect of the present invention, there is provided a dynamoelectric machine including: a rotor having: a pole core having: a boss portion; a pair of yoke portions that are disposed so as to extend radially outward from two axial end edge portions of the boss portion; and a plurality of claw-shaped magnetic pole portions that are disposed so as to extend axially alternately from each of the pair of yoke portions, and that are arranged circumferentially so as to intermesh with each other, the pole core being fixed to a shaft that is inserted through a central axial position of the boss portion; and a field coil that is housed inside a space that is surrounded by the boss portion, the pair of yoke portions, and the plurality of claw-shaped magnetic pole portions. In addition, the present dynamoelectric machine includes: a permanent magnet holding portion that is disposed integrally so as to project from the yoke portion, the permanent magnet holding portion facing an inner circumferential surface near a tip end of the claw-shaped magnetic pole portion; an arc-shaped magnet holding aperture that has a C-shaped cross section that is formed in the permanent magnet holding portion so as to have an aperture center that is oriented axially, in which at least one axial end is open, and that opens radially outward; a magnet holding member that is made of a nonmagnetic material that is fitted into and held by the magnet holding aperture; and a permanent magnet that is held by the magnet holding member so as to face the inner circumferential surface near the tip end of the claw-shaped magnetic pole portions, that is prepared into a prismatic body that has a quadrilateral cross section perpendicular to an axial direction, and that is magnetically oriented in a reverse direction to an orientation of a magnetic field produced by the field coil.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 6 is a graph that represents a relationship between field ampere turns (field AT) and stator interlinked magnetic flux in the automotive alternator according to Embodiment 1 of the present invention;

FIG. 7 is a table that shows generated power relative to rotational frequency in the automotive alternator according to Embodiment 1 of the present invention;

FIG. 8 is a perspective that explains a configuration of a permanent magnet that can be mounted onto a rotor that can be used in an automotive alternator according to Embodiment 2 of the present invention;

DETAILED DESCRIPTION OF THE PREFERRED EMBODIMENTS

Embodiment 1

Figure 1:
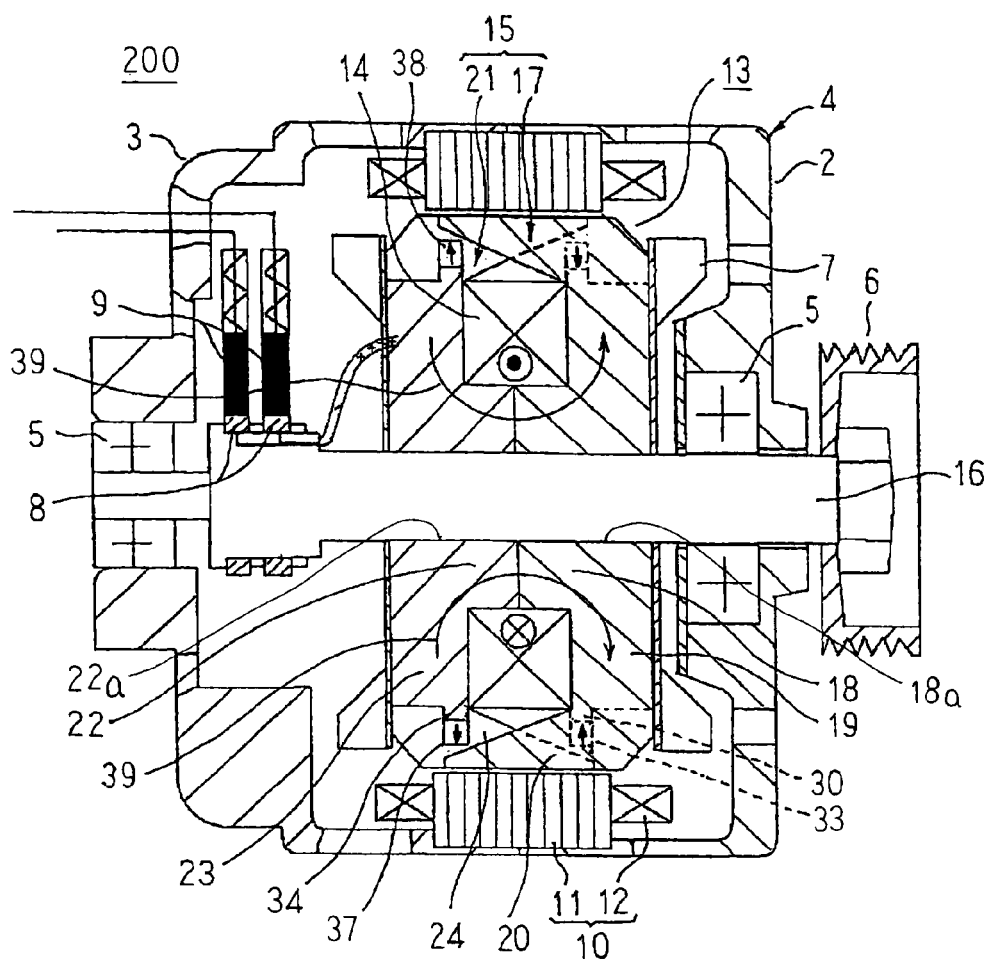
FIG. 1 is a cross section that schematically shows an automotive alternator according to Embodiment 1 of the present invention.
Figure 2:
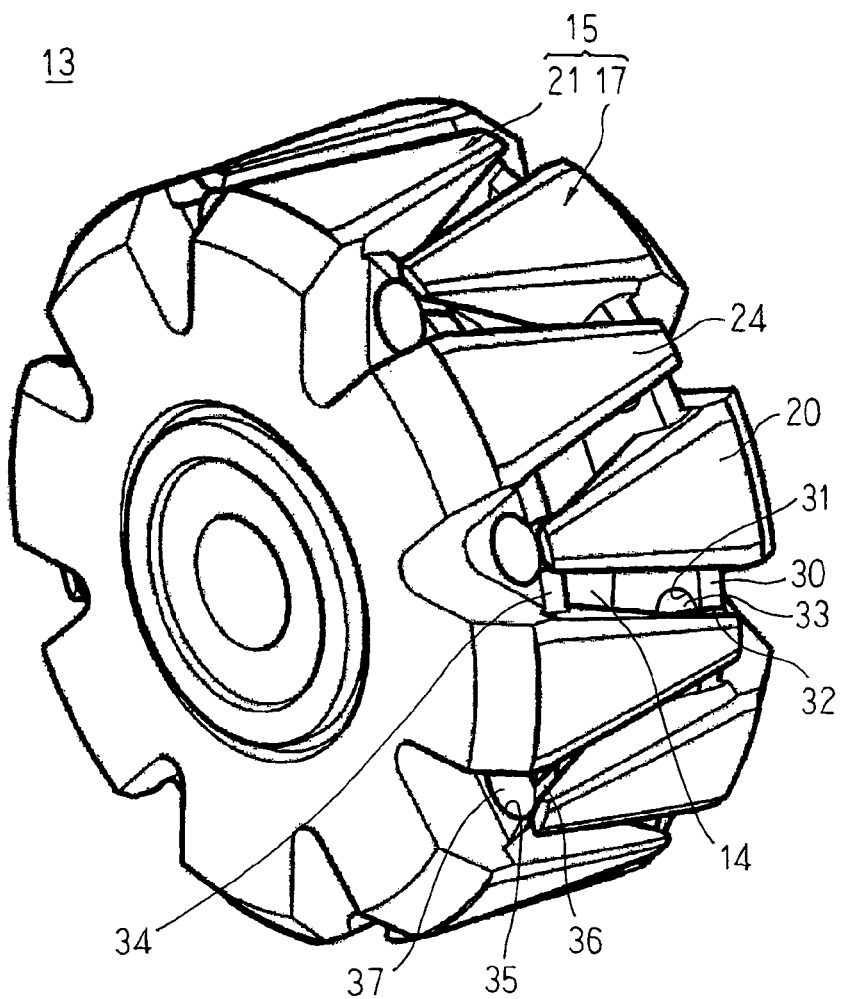
FIG. 2 is a perspective of a rotor that can be used in the automotive alternator according to Embodiment 1 of the present invention.
Figure 3:
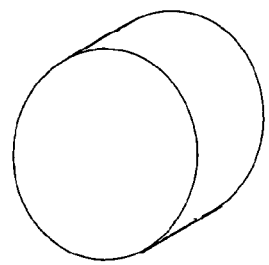
FIG. 3 is a perspective that explains a configuration of a permanent magnet that can be mounted onto the rotor that can be used in the automotive alternator according to Embodiment 1 of the present invention.
Figure 4:
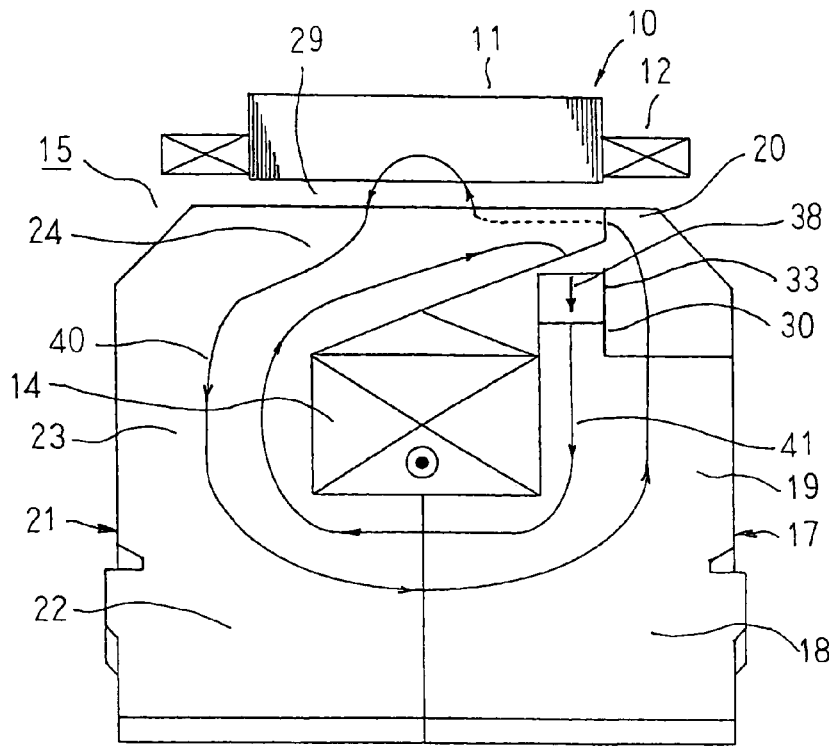
FIG. 4 is a schematic diagram for explaining flow of magnetic flux in the automotive alternator according to Embodiment 1 of the present invention.
Figure 5:
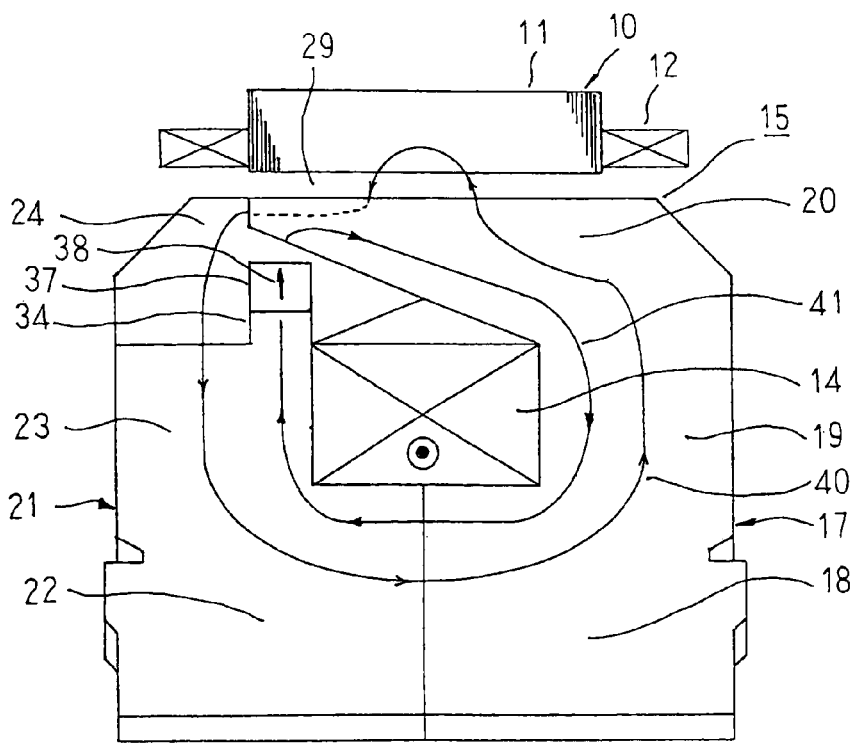
FIG. 5 is a schematic diagram for explaining flow of magnetic flux in the automotive alternator according to Embodiment 1 of the present invention.

FIG. 1 is a cross section that schematically shows an automotive alternator according to Embodiment 1 of the present invention, FIG. 2 is a perspective of a rotor that can be used in the automotive alternator according to Embodiment 1 of the present invention, FIG. 3 is a perspective that explains a configuration of a permanent magnet that can be mounted onto the rotor that can be used in the automotive alternator according to Embodiment 1 of the present invention, and FIGS. 4 and 5 are respective schematic diagrams for explaining flow of magnetic flux in the automotive alternator according to Embodiment 1 of the present invention.

In FIGS. 1 through 3, an automotive alternator 200 includes: a case 4 that is constituted by a front bracket 2 and a rear bracket 3 that are each made of aluminum so as to have an approximate cup shape; a rotor 13 that is rotatably disposed inside the case 4 such that a shaft 16 is supported by means of bearings 5 in the case 4; a pulley 6 that is fixed to an end portion of the shaft 16 that projects outward at a front end of the case 4; fans 7 that are fixed to first and second axial end surfaces of the rotor 13; a stator 10 that is fixed to the case 4 so as to surround an outer circumference of the rotor 13 so as to have a constant air gap 29 relative to the rotor 13; a pair of slip rings 8 that are fixed to a rear end of the shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is installed in the stator core 11, and in which an alternating current arises due to changes in magnetic flux from a field coil 14 (described below) that accompany rotation of the rotor 13.

The rotor 13 includes: a field coil 14 that generates magnetic flux on passage of an excitation current; a pole core 15 that is disposed so as to cover the field coil 14 and in which magnetic poles are formed by that magnetic flux; and the shaft 16 that is fitted through a central axial position of the pole core 15.

The pole core 15 is constructed so as to be divided into first and second pole core bodies 17 and 21 that are each prepared by a cold forging manufacturing method using a low carbon steel such as S10C, for example.

The first pole core body 17 has: a first boss portion 18 that has an outer circumferential surface that has a cylindrical shape, and through which a shaft insertion aperture 18a is disposed at a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially.

The second pole core body 21 has: a second boss portion 22 that has an outer circumferential surface that has a cylindrical shape, and through which a shaft insertion aperture 22a is disposed at a central axial position; a thick ring-shaped second yoke portion 23 that is disposed so as to extend radially outward from a second end edge portion of the second boss portion 22; and second claw-shaped magnetic pole portions 24 that are disposed so as to extend toward a first axial end from outer circumferential portions of the second yoke portion 23. Eight, for example, second claw-shaped magnetic pole portions 24 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially.

The first and second pole core bodies 17 and 21 that are configured in this manner are fixed to the shaft 16 that has been fitted through the shaft insertion apertures 18a and 22a such that the first and second claw-shaped magnetic pole portions 20 and 24 alternately intermesh and a second end surface of the first boss portion 18 is abutted to a first end surface of the second boss portion 22. The field coil 14, which has been wound onto a bobbin (not shown), is mounted in a space that is surrounded by the first and second boss portions 18 and 22, the first and second yoke portions 19 and 23, and the first and second claw-shaped magnetic pole portions 20 and 24. Here, the first and second boss portions 18 and 22 and the first and second yoke portions 19 and 23 correspond to a boss portion and first and second yoke portions of the pole core 15.

First magnet holding seats 30 that function as a permanent magnet holding portion are formed integrally on the first pole core body 17 by a cold forging manufacturing method. These first magnet holding seats 30 are disposed integrally so as to project on outer circumferential surfaces of the first yoke portion 19 that face inner circumferential surfaces near each of the tip ends of the second claw-shaped magnetic pole portions 24. Cylindrical first magnet holding apertures 31 are disposed through the first magnet holding seats 30 so as to have aperture centers that are oriented axially. First axial openings 32 that open the first magnet holding apertures 31 toward the second claw-shaped magnetic pole portions 24 are formed so as to extend from a first axial end to a second axial end on outer circumferential portions of the first magnet holding seats 30. These first magnet holding apertures 31 are formed such that a cross section that is perpendicular to the aperture center has a C-shaped arc shape. Inner wall surfaces of the first magnet holding apertures 31 that are formed so as to have C-shaped cross sections are cylindrical surfaces that lack circumferential portions. A "C-shaped arc shape" means a shape like a circle that lacks a circumferential portion in a similar to a letter C, which has no line on its right-hand side.

First permanent magnets 33 are prepared into cylindrical bodies that have outer wall surface shapes that conform to inner wall surface shapes of the first magnet holding apertures 31 that have the first axial openings 32 each formed on a portion of the inner circumferential wall thereof so as to face the inner circumferential surface near the tip end of the second claw-shaped magnetic pole portion 24, and are inserted into the first magnet holding apertures 31 from an axial direction and held. Here, portions of the first permanent magnets 33 that are exposed through the first axial openings 32 face the inner circumferential surfaces near the tip ends of the second claw-shaped magnetic pole portions 24.

Second magnet holding seats 34 that function as a permanent magnet holding portion are formed integrally on the second pole core body 21 by a cold forging manufacturing method. These second magnet holding seats 34 are disposed integrally so as to project on outer circumferential surfaces of the second yoke portion 23 that face inner circumferential surfaces near each of the tip ends of the first claw-shaped magnetic pole portions 20. Cylindrical second magnet holding apertures 35 are disposed through the second magnet holding seats 34 so as to have aperture centers that are oriented axially. Second axial openings 36 that open the second magnet holding apertures 35 toward the first claw-shaped magnetic pole portions 20 are formed so as to extend from a first axial end to a second axial end on outer circumferential portions of the second magnet holding seats 34. These second magnet holding apertures 35 are formed such that a cross section that is perpendicular to the aperture center has a C-shaped arc shape.

Second permanent magnets 37 are prepared into cylindrical bodies that have outer wall surface shapes that conform to inner wall surface shapes of the second magnet holding apertures 35, and are inserted into the second magnet holding apertures 35 from an axial direction and held. Here, portions of the second permanent magnets 37 that are exposed through the second axial openings 36 face the inner circumferential surfaces near the tip ends of the first claw-shaped magnetic pole portions 20.

The first and second permanent magnets 33 and 37 are magnetically oriented so as to have directions of magnetization 38 that are opposite to the orientation of a magnetic field 39 that the field current that flows through the field coil 14 produces in a plane that is perpendicular to a central axis of the rotor 13. In other words, if the magnetic field 39 is generated in the direction of the arrow as shown in FIG. 1 when an electric current is passed through the field coil 14, the first and second permanent magnets 33 and 37 are magnetically oriented in a reverse direction to the magnetic field 39. In this case, the directions of magnetization 38 of the first and second permanent magnets 33 and 37 are oriented radially, and extensions of the directions of magnetization 38 are directed at inner circumferential surfaces near the tip ends of the facing first and second claw-shaped magnetic pole portions 20 and 24. Moreover, in the case of a design in which the orientation of the magnetic field 39 that the field current that flows through the field coil 14 produces is inverted, the first and second permanent magnets 33 and 37 will also be magnetically oriented in a reverse direction.

Next, operation of an automotive alternator 200 that has been configured in this manner will be explained.

First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles.

At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

Next, operation of the magnetic flux will be explained with reference to FIGS. 4 and 5.

First, magnetic flux 40 is generated when an electric current is passed through the field coil 14. This magnetic flux 40 enters tooth portions of the stator core 11 by passing through the air gap 29 from the first claw-shaped magnetic pole portions 20. The magnetic flux 40 then moves circumferentially through a core back portion from the tooth portions of the stator core 11, and enters neighboring second claw-shaped magnetic pole portions 24 by passing through the air gap 29 from the tooth portions that face those second claw-shaped magnetic pole portions 24. Next, the magnetic flux 40 that has entered the second claw-shaped magnetic pole portions 24 passes through the second yoke portion 23, the second boss portion 22, the first boss portion 18, and the first yoke portion 19, and reaches the first claw-shaped magnetic pole portions 20. Now, in a conventional Lundell rotor, because the first and second pole core bodies are at their design limit, they are magnetically saturated by the magnetic field that is generated by the field coil, reducing magnetic flux that is generated by the rotor.

In Embodiment 1, the first and second permanent magnets 33 and 37 are magnetically oriented so as to be opposite to the orientation of the magnetic field 39 that is generated by the field coil 14. Thus, the orientation of the magnetic field that originates from the first and second permanent magnets 33 and 37 is in a reverse direction to the magnetic field 39 that is generated by the field coil 14. To interlink with the stator core 11, it is necessary for the magnetic flux 41 that originates from these first and second permanent magnets 33 and 37 to make a round trip across the air gap 29, which has a large magnetic resistance. The first and second permanent magnets 33 and 37 are disposed radially inside the second and first claw-shaped magnetic pole portions 24 and 20, and are disposed so as to circuit in a shorter magnetic path length than the inner circumferential surface sides of the first and second claw-shaped magnetic pole portions 20 and 24. Thus, a large portion of the magnetic flux 41 forms a closed magnetic circuit inside the rotor without going around through the stator core 11.

In other words, the magnetic flux 41 that originates from the first permanent magnets 33 passes from the first magnet holding seats 30 through the first yoke portion 19, the first boss portion 18, the second boss portion 22, the second yoke portion 23, and the second claw-shaped magnetic pole portions 24, and returns to the first permanent magnets 33. The magnetic flux 41 that originates from the second permanent magnets 37 enters the first claw-shaped magnetic pole portions 20 through the gap, passes through the first yoke portion 19, the first boss portion 18, the second boss portion 22, the second yoke portion 23, and the second magnet holding seat 34, and returns to the second permanent magnets 37.

Thus, the magnetic flux 41 that originates from the first and second permanent magnets 33 and 37 is in a reverse direction from the magnetic flux 40 that originates from the field coil 14, enabling the magnetic flux density of the magnetic bodies that constitute the first and second pole core bodies 17 and 21 to be reduced significantly, thereby enabling magnetic saturation to be relieved.

Next, stator interlinked magnetic flux relative to field ampere turns (field AT) and generated power relative to rotational frequency were measured using an automotive alternator 200 that was configured in this manner, and the results are shown in FIGS. 6 and 7. For comparison, a conventional device from which the first and second permanent magnets 33 and 37 were omitted was prepared, stator interlinked magnetic flux relative to field ampere turns (field AT) and generated power (direct current A) relative to rotational frequency were measured, and the results are also shown in FIGS. 6 and 7. Moreover, in FIG. 6, a solid line represents the present invention, and a broken line represents the comparative device.

It can be seen from FIG. 6 that the difference between the automotive alternator 200 and the conventional device is small in a region in which field AT is small, and the difference between the automotive alternator 200 and the conventional device increases when a region in which magnetic saturation begins is exceeded. In other words, it can be seen that disposing the first and second permanent magnets 33 and 37 relieves magnetic saturation, thereby increasing the amount of magnetic flux that interlinks with the stator 10.

Similarly, it can be seen from FIG. 7 that greater generated power can be obtained in the automotive alternator 200 than in the conventional device, particularly in a low rotational frequency range.

In other words, in conventional devices, thirty percent or more of the magnetomotive force of the field is expended in the magnetic circuit of the rotor as a result of magnetic saturation, making it difficult to increase the amount of magnetic flux. In Embodiment 1, on the other hand, because magnetic saturation is relieved as described above, it can be inferred that the magnetic flux that interlinks with the stator 10 is increased, increasing generated power. In particular, it has been confirmed that generated power can be increased significantly in a low-speed idling region where magnetic saturation is pronounced.

In Embodiment 1, because the first and second permanent magnets 33 and 37 are disposed so as to face inner circumferential surfaces of the first and second claw-shaped magnetic pole portions 20 and 24, the first and second permanent magnets 33 and 37 are positioned radially inside an external surface of the rotor 13. Thus, stator slot harmonics are confined to surface portions of the first and second claw-shaped magnetic pole portions 20 and 24, and do not act to heat the first and second permanent magnets 33 and 37 by direct induction. As a result, the first and second permanent magnets 33 and 37 are prevented from being heated and thermally demagnetized.

Because the first and second permanent magnets 33 and 37 are disposed so as to face the inner circumferential surfaces of the first and second claw-shaped magnetic pole portions 20 and 24, the magnetic circuits of the first and second permanent magnets 33 and 37 are closed magnetic circuits inside the rotor, eliminating magnetic flux components that interlink with the stator 10. Thus, the occurrence of voltages induced by the first and second permanent magnets 33 and 37 during no-load de-energization is suppressed. As a result, the magnet volume of the first and second permanent magnets 33 and 37 can be increased.

The first and second permanent magnets 33 and 37 are mounted onto the first and second yoke portions 19 and 23. Thus, because the first and second permanent magnets 33 and 37 are positioned radially inside the first and second claw-shaped magnetic pole portions 20 and 24, centrifugal forces that act on the first and second permanent magnets 33 and 37 are reduced, enabling the holding construction for the first and second permanent magnets 33 and 37 to be simplified. Because the first and second permanent magnets 33 and 37 are not affected by the first and second claw-shaped magnetic pole portions 20 and 24, which are displaced greatly relative to centrifugal force, holding of the first and second permanent magnets 33 and 37 is facilitated. In addition, because the first and second permanent magnets 33 and 37 are not affected by axial displacement between the claw-shaped magnetic pole portions that results from thermal expansion of the rotor, holding of the first and second permanent magnets 33 and 37 is also facilitated if the present invention is applied to automotive alternators that have a wide temperature range. Because of these facts, the holding reliability for the first and second permanent magnets 33 and 37 is improved.

Because the first and second permanent magnets 33 and 37 are positioned radially inside the first and second claw-shaped magnetic pole portions 20 and 24, increases in moment of inertia that result from the first and second permanent magnets 33 and 37 being disposed can be reduced, also enabling increases in inertia torque to be suppressed.

Next, effects of the holding construction for the first and second permanent magnets 33 and 37 according to Embodiment 1 will be explained.

The first and second magnet holding apertures 31 and 35 are disposed through the first and second magnet holding seats 30 and 34 in a cylindrical shape so as to have aperture directions that are oriented axially. The first and second axial openings 32 and 36 are formed on the first and second magnet holding seats 30 and 34 so as to communicate the first and second magnet holding apertures 31 and 35 toward the second and first claw-shaped magnetic pole portions 24 and 20. The first and second permanent magnets 33 and 37, which have been prepared into cylindrical bodies that have outer wall surface shapes that conform to the inner circumferential wall shapes of the first and second magnet holding apertures 31 and 35, are inserted into the first and second magnet holding apertures 31 and 35 from an axial direction and held.

Thus, because the aperture shapes of the first and second magnet holding apertures 31 and 35 are cylindrical shapes, they can easily be molded using a cold forging manufacturing method. In addition, first and second magnet holding apertures 31 and 35 that have high-precision aperture dimensions can be formed after molding by applying simple and convenient additional milling using a rotary cutting tool such as a drill or a reamer, etc. Because the first and second permanent magnets 33 and 37 are cylindrical bodies, they can be molded easily using a metal mold. In addition, first and second permanent magnets 33 and 37 that have high-precision outside diameter dimensions can be formed after molding by applying simple and convenient additional milling using a rotary cutting tool such as a drill or a reamer, etc.

Thus, according to the present magnet holding construction, interfitting surfaces can be prepared by molding using a metal mold, or by cutting using a rotary cutting tool, etc., making three-dimensional cutting processes that use numerically controlled (NC) milling machines, etc., unnecessary, enabling manufacturing time to be shortened and manufacturing costs to be reduced.

Because the interfitting surfaces are cylindrical surfaces, milling precision can be raised, enabling the first and second permanent magnets 33 and 37 to be held firmly in the first and second magnet holding apertures 31 and 35 in a stable state without wobbling. Thus, even if the automotive alternator 200 is subjected to vibrations from an automobile engine, the occurrence of cracking and chipping of the first and second permanent magnets 33 and 37 can be suppressed. Even if the rotor 13 rotates at high speed, situations such as the first and second permanent magnets 33 and 37 dislodging from the first and second magnet holding apertures 31 and 35 and being thrown can also be avoided.

Because contact surfaces between the first and second permanent magnets 33 and 37 and the first and second magnet holding apertures 31 and 35 are cylindrical surfaces, there are no local concentrations of stress, suppressing the occurrence of damage to the first and second permanent magnets 33 and 37 and the first and second magnet holding seats 30 and 34.

In addition, because positions for disposing the first and second permanent magnets 33 and 37 can be positioned with high precision, contact between the first and second permanent magnets 33 and 37 and the first and second magnet holding apertures 31 and 35 can be avoided without lowering output.

In this embodiment, magnet holding seats are disposed on first and second pole core bodies at all of the positions that face the leading ends of the claw-shaped magnetic pole portions, magnet holding apertures are disposed in all of the magnet holding seats, and magnet holding members in which permanent magnets are held are inserted into all of the magnet holding apertures. However, magnet holding seats do not need to be disposed at all of the positions that face the leading ends of the claw-shaped magnetic pole portions, magnet holding apertures do not need to be disposed in all of the magnet holding seats, and magnet holding members in which permanent magnets are held do not need to be inserted into all of the magnet holding apertures. While giving consideration to maintaining the mechanical and magnetic balance of the rotor, a magnet holding seat should be disposed at least one position that faces the leading end of a claw-shaped magnetic pole portion, a magnet holding aperture should be disposed in at least one magnet holding seat, and a magnet holding member in which a permanent magnet is held should be inserted into at least one magnet holding aperture. This also applies to the other embodiments.

Embodiment 2

Figure 9:
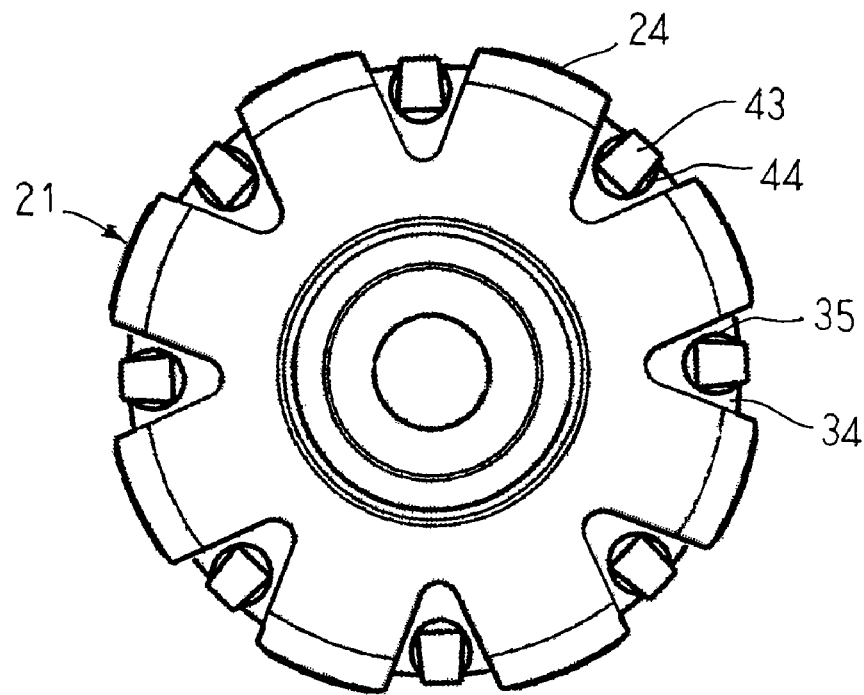
FIG. 9 is a front elevation of the rotor that can be used in the automotive alternator according to Embodiment 2 of the present invention.
Figure 10:
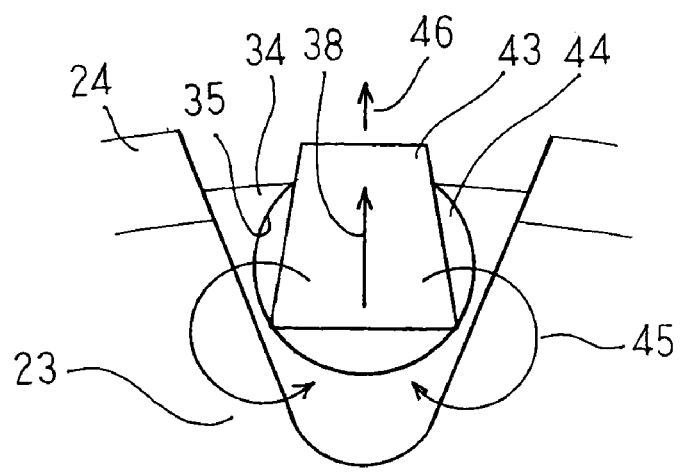
FIG. 10 is a schematic diagram for explaining flow of magnetic flux in the automotive alternator according to Embodiment 2 of the present invention.

FIG. 8 is a perspective that explains a configuration of a permanent magnet that can be mounted onto a rotor that can be used in an automotive alternator according to Embodiment 2 of the present invention, FIG. 9 is a front elevation of the rotor that can be used in the automotive alternator according to Embodiment 2 of the present invention, and FIG. 10 is a schematic diagram for explaining flow of magnetic flux in the automotive alternator according to Embodiment 2 of the present invention.

In FIG. 8, a permanent magnet 43 is prepared into a columnar body that has a trapezoidal cross section, and is molded in an insulating resin such as an epoxy, nylon 66, etc., such that a portion near a short side of the trapezoidal cross section protrudes. Except for the protruding portion of the permanent magnet 43, a resin body 44 that functions as a magnet holding member that is constituted by this molded body of insulating resin is prepared into a cylindrical body that has an outer circumferential wall surface shape that conforms to an inner circumferential wall surface shape of first and second magnet holding apertures 31 and 35. As shown in FIG. 9, the resin bodies 44 are inserted into the second magnet holding apertures 35 from an axial direction and held. The portions of the permanent magnets 43 protruding from the resin bodies 44 extend outward through second axial openings 36 of the second magnet holding apertures 35, and face inner circumferential surfaces near tip ends of first claw-shaped magnetic pole portions 20. Although not shown, the resin bodies 44 into which the permanent magnets 43 have been molded are also inserted into the first magnet holding apertures 31 from an axial direction and held.

Moreover, the rest of this embodiment is configured in a similar manner to Embodiment 1 above.

In Embodiment 2, the outer circumferential wall surfaces of the resin bodies 44 into which the permanent magnets 43 have been molded constitute surfaces that interfit with the first and second magnet holding apertures 31 and 35. Because the resin bodies 44 can easily be prepared into cylindrical bodies of high dimensional precision compared to the permanent magnets, costs can be reduced compared to Embodiment 1 above in which permanent magnets were prepared into cylindrical bodies. The volume of the permanent magnets 43, which are expensive, can also be reduced, enabling costs to be reduced proportionately.

Because the nonmagnetic resin bodies 44 are interposed between the permanent magnets 43 and the second magnet holding apertures 35, magnetic leakage flux 45, in which portions of the magnetic flux of the permanent magnets 43 leaks to the second magnet holding seats 34 and returns to the permanent magnets 43 as shown in FIG. 10, is reduced, increasing the amount of magnetic flux 46 that is directed toward the facing first claw-shaped magnetic pole portions 20. As a result, magnet magnetic flux to rotor interior portions is increased, further increasing magnetic saturation alleviation effects, and enabling power generated by the automotive alternator to be further increased.

Because the resin bodies 44 insulate heat from being transferred from the field coil 14 to the permanent magnets 43 by means of the first and second magnet holding seats 30 and 34, temperature increases in the permanent magnets 43 can be suppressed. Thus, thermal demagnetization can be suppressed even if rare-earth magnets, which are easily demagnetized by heat, are used as a magnet material.

Figure 11:
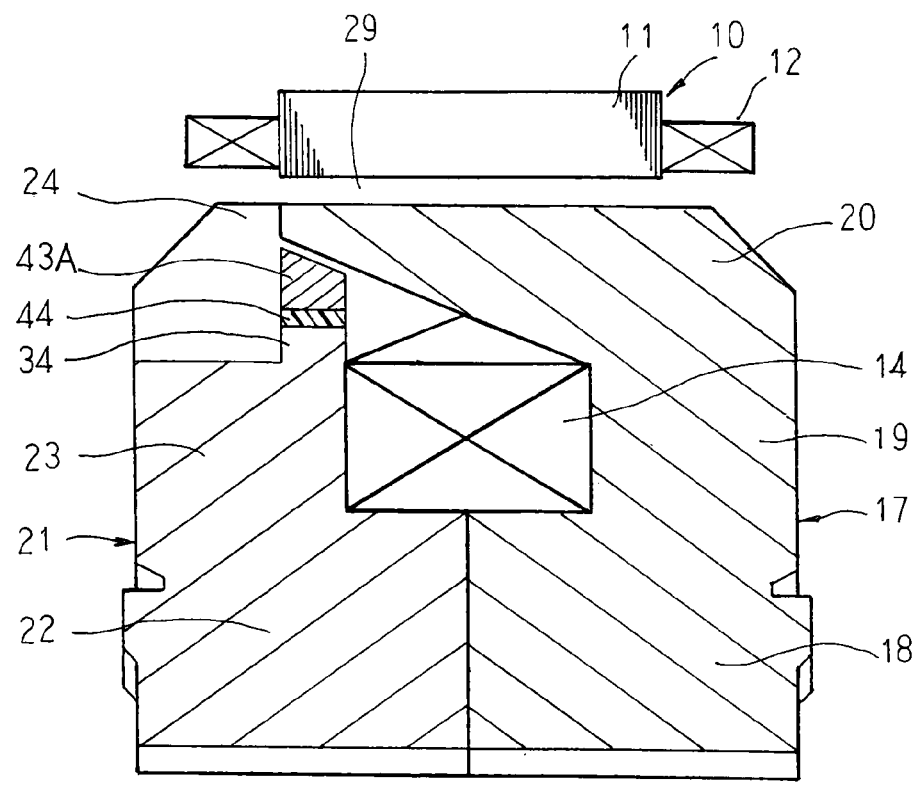
FIG. 11 is a partial cross section of a preferred variation of the automotive alternator according to Embodiment 2 of the present invention.

Moreover, in Embodiment 2 above, upper surfaces of permanent magnets 43A that are constituted by short sides of trapezoidal cross sections may also be formed into flat surfaces that are parallel to inner circumferential surfaces near tip ends of facing first and second claw-shaped magnetic pole portions 20 and 24, as shown in FIG. 11. In that case, gaps between the permanent magnets and the claw-shaped magnetic pole portions can be minimized.

Embodiment 3

Figure 12:
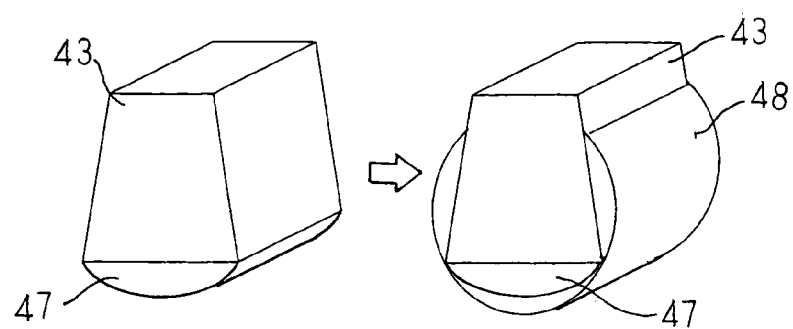
FIG. 12 is a diagram that explains a configuration of a permanent magnet that can be mounted onto a rotor that can be used in an automotive alternator according to Embodiment 3 of the present invention.

FIG. 12 is a diagram that explains a configuration of a permanent magnet that can be mounted onto a rotor that can be used in an automotive alternator according to Embodiment 3 of the present invention.

In FIG. 12, a magnetic body 47 that has an arc-shaped cross section that is made of iron, etc., is bonded to a bottom surface that is constituted by a long side of a trapezoidal cross section of a permanent magnet 43. These are molded in an insulating resin such that a portion of the permanent magnet 43 near a short side of the trapezoidal cross section projects, and such that the magnetic body 47 is embedded. Except for the protruding portion of the permanent magnet 43, a resin body 48 that functions as a magnet holding member that is constituted by this molded body of insulating resin is prepared into a cylindrical body that has an outer circumferential wall surface shape that conforms to an inner circumferential wall surface shape of first and second magnet holding apertures 31 and 35.

Moreover, the rest of this embodiment is configured in a similar manner to Embodiment 2 above.

In Embodiment 3, magnetic gaps between the permanent magnets 43 and the first and second magnet holding seats 30 and 34 in Embodiment 2 above are filled by the magnetic bodies 47, enabling magnetic resistance to be reduced. That is, magnetic resistance in the magnet magnetic path decreases, magnet magnetic flux quantity increases, and rotor magnetic saturation alleviation effects are further increased, enabling generated output to be further increased.

Embodiment 4

Figure 13:
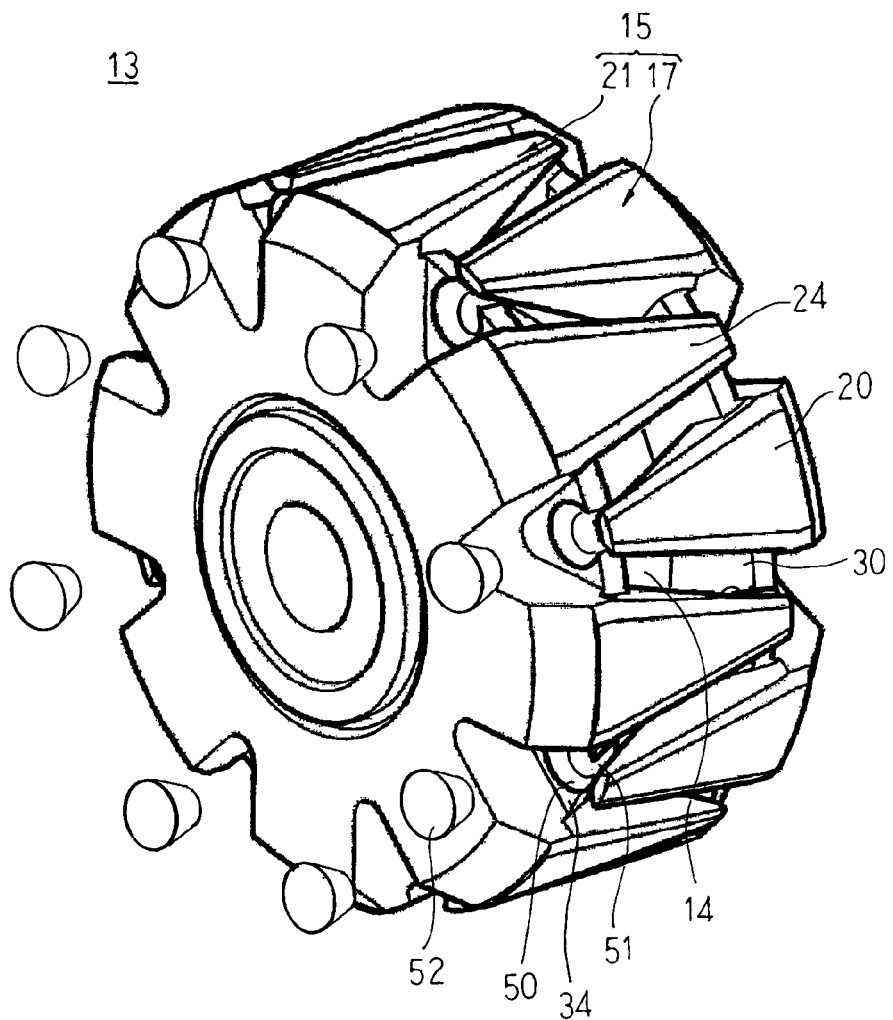
FIG. 13 is an exploded perspective of a rotor that can be used in an automotive alternator according to Embodiment 4 of the present invention.

FIG. 13 is an exploded perspective of a rotor that can be used in an automotive alternator according to Embodiment 4 of the present invention.

In FIG. 13, truncated conical second magnet holding apertures 50 are disposed through second magnet holding seats 34 so as to have aperture centers that are oriented axially. Second axial openings 51 that open the second magnet holding apertures 50 toward first claw-shaped magnetic pole portions 20 are formed so as to extend from a first axial end to a second axial end on outer circumferential portions of the second magnet holding seats 34. Second permanent magnets 52 are prepared into truncated conical bodies that have outer wall surface shapes that conform to inner wall surface shapes of the second magnet holding apertures 50, and are inserted into the second magnet holding apertures 50 from an axial direction and held. Here, portions of the second permanent magnets 52 that are exposed through the second axial openings 51 face inner circumferential surfaces near tip ends of the first claw-shaped magnetic pole portions 20.

Here, although not shown, truncated conical first magnet holding apertures are disposed through first magnet holding seats 30 so as to have aperture centers that are oriented axially. First axial openings that open the first magnet holding apertures toward second claw-shaped magnetic pole portions 24 are formed so as to extend from a first axial end to a second axial end on outer circumferential portions of the first magnet holding seats 30. First permanent magnets are prepared into truncated conical bodies that have outer wall surface shapes that conform to inner wall surface shapes of the first magnet holding apertures, and are inserted into the first magnet holding apertures from an axial direction and held. Here, portions of the first permanent magnets that are exposed through the first axial openings face inner circumferential surfaces near tip ends of the second claw-shaped magnetic pole portions 24.

Moreover, the rest of this embodiment is configured in a similar manner to Embodiment 1 above.

Because the supporting constructions for the first and second permanent magnets are the same, only the supporting construction for the second permanent magnets 52 will be explained here.

In Embodiment 4, because the second magnet holding apertures 50 are formed so as to have a truncated conical inner circumferential wall surface shape, they can also easily be molded using a cold forging manufacturing method. In addition, second magnet holding apertures 50 that have high-precision aperture dimensions can be formed after molding by applying simple and convenient additional milling using a rotary cutting tool such as a drill or a reamer, etc. Because the second permanent magnets 52 are formed into truncated conical bodies, they can easily be molded using a cold forging manufacturing method. In addition, second permanent magnets 52 that have high-precision outside dimensions can be formed after molding by applying simple and convenient additional milling using a rotary cutting tool such as a drill or a reamer, etc.

Because interfitting surfaces between the second magnet holding apertures 50 and the second permanent magnets 52 are outer circumferential surfaces of a truncated cone, the second permanent magnets 52 can be axially positioned accurately at design positions relative to the second magnet holding apertures 50 simply by inserting the second permanent magnets 52 into the second magnet holding apertures 50 from an axial direction.

Gaps between the second permanent magnets 52 and the first claw-shaped magnetic pole portions 20 can be minimized by making angles of the outer circumferential surfaces of the truncated conical bodies of the second permanent magnets 52 relative to an axial direction approximately equal to angles of the inner circumferential surfaces near the tip ends of the facing first claw-shaped magnetic pole portions 20 relative to the axial direction.

Moreover, in Embodiment 4 above, permanent magnets 43 that have trapezoidal cross sections may also be molded into resin bodies that are truncated conical bodies such that portions protrude in a similar manner to Embodiment 2 above. In addition, magnetic bodies 47 may also be bonded to bottom surfaces of the permanent magnets 43 in a similar manner to Embodiment 3 above.

Embodiment 5

Figure 14:
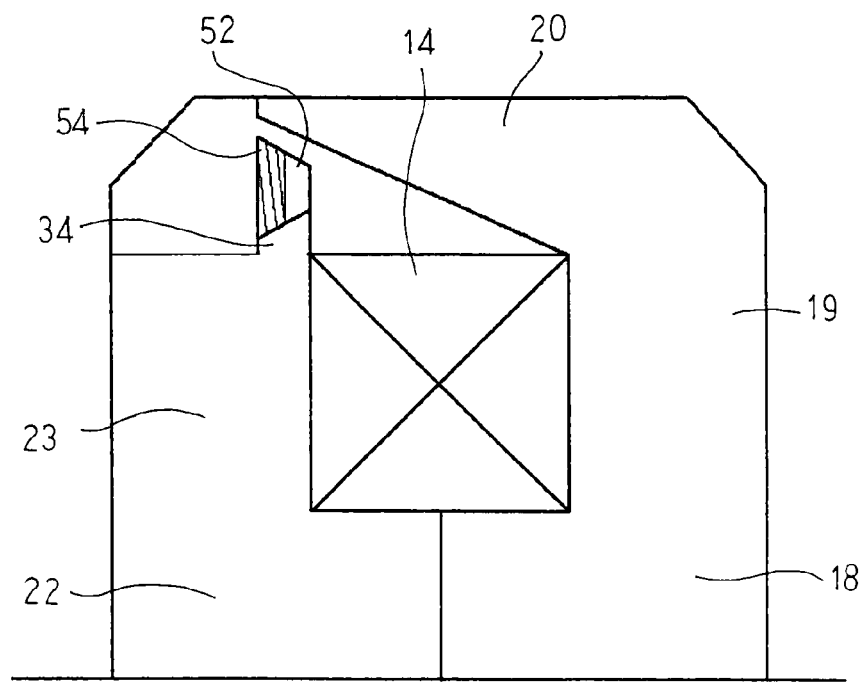
FIG. 14 is a cross section that schematically shows a configuration of a rotor that can be used in an automotive alternator according to Embodiment 5 of the present invention.
Figure 15:
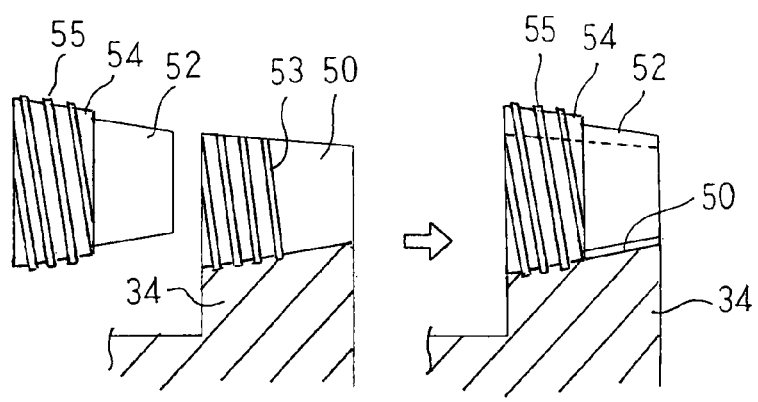
FIG. 15 is a partial cross section that explains a supporting construction for a permanent magnet in the rotor that can be used in the automotive alternator according to Embodiment 5 of the present invention.

FIG. 14 is a cross section that schematically shows a configuration of a rotor that can be used in an automotive alternator according to Embodiment 5 of the present invention, and FIG. 15 is a partial cross section that explains a supporting construction for a permanent magnet in the rotor that can be used in the automotive alternator according to Embodiment 5 of the present invention.

In FIGS. 14 and 15, an internal thread portion 53 is inscribed into an inner circumferential wall surface at a large diameter end of a second magnet holding aperture 50. A nonmagnetic body ring 54 that functions as a magnet holding member is prepared using a thin stainless alloy or an epoxy resin, and is fitted over a large diameter end of a permanent magnet 52. An external screw thread portion 55 is inscribed on an outer circumferential wall surface of the nonmagnetic body ring 54. The permanent magnet 52 is inserted into the second magnet holding aperture 50 and held by fastening the external screw thread portion 55 into the internal thread portion 53. Moreover, internal thread portions 53 are also inscribed into inner circumferential wall surfaces at large diameter ends of first magnet holding apertures, and permanent magnets 52 are inserted into the first magnet holding apertures and held by fastening the external screw thread portions 55 into the internal thread portions 53. The rest of this embodiment is configured in a similar manner to Embodiment 4 above.

Thus, because the permanent magnets 52 are held in the magnet holding apertures by screw fastening between the internal thread portion 53 and the external screw thread portion 55, even if axial dimensions of the first and second magnet holding seats become restricted due to machining errors, etc., the holding firmness of the permanent magnets 52 is increased, preventing throwing of the permanent magnets 52.

Now, in Embodiment 5 above, external screw thread portions are inscribed in nonmagnetic body rings, and internal thread portions are inscribed in magnet holding apertures, but internal thread portions may also be inscribed in nonmagnetic body rings, and external screw thread portions inscribed in magnet holding apertures.

Embodiment 5 above is explained as being applied to permanent magnets that have truncated conical bodies, but may also be applied to permanent magnets that have cylindrical bodies. In other words, in Embodiment 1 above, nonmagnetic body rings into which an external screw thread portion has been inscribed may be fitted onto first and second permanent magnets, internal thread portions inscribed into first and second magnet holding apertures, and the first and second permanent magnets inserted into the first and second magnet holding apertures and held by fastening the external thread portions into the internal thread portions.

Embodiment 6

Figure 16:
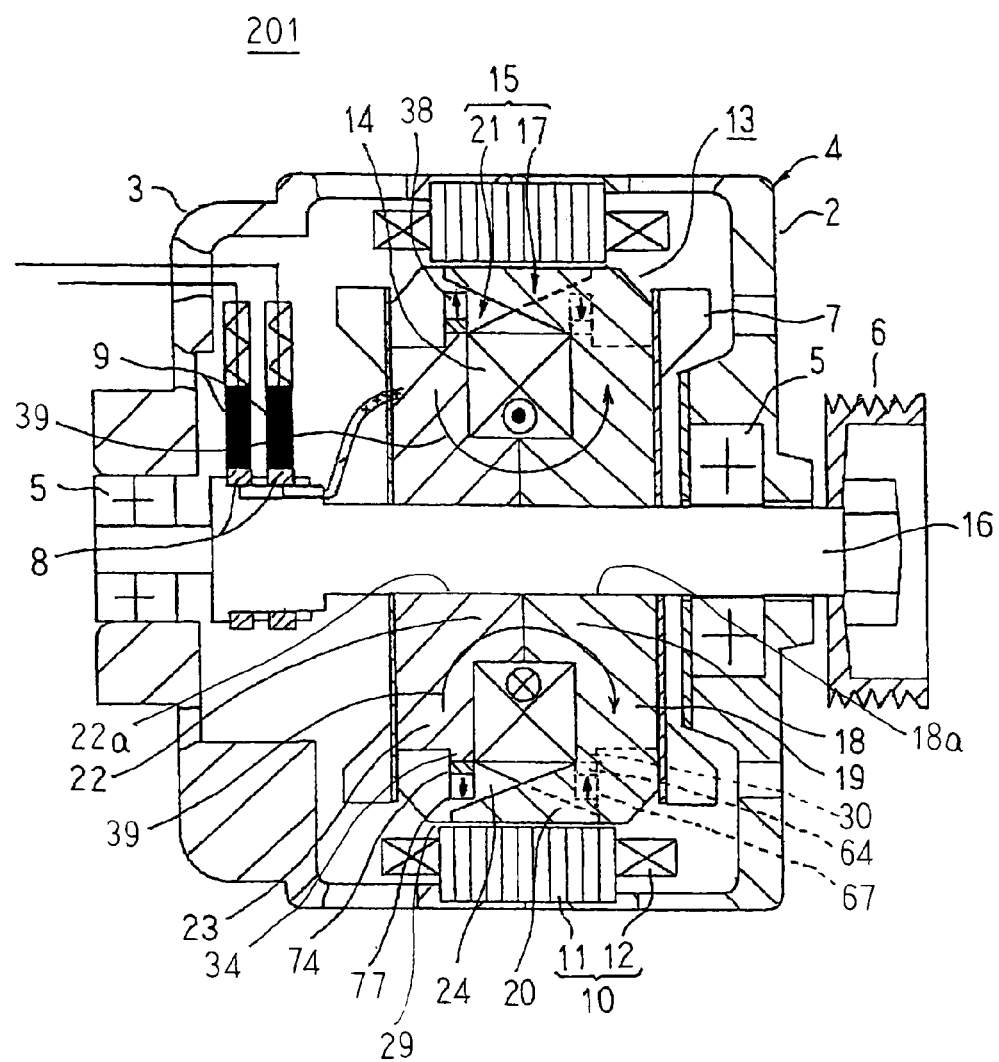
FIG. 16 is a cross section that schematically shows an automotive alternator according to Embodiment 6 of the present invention.
Figure 17:
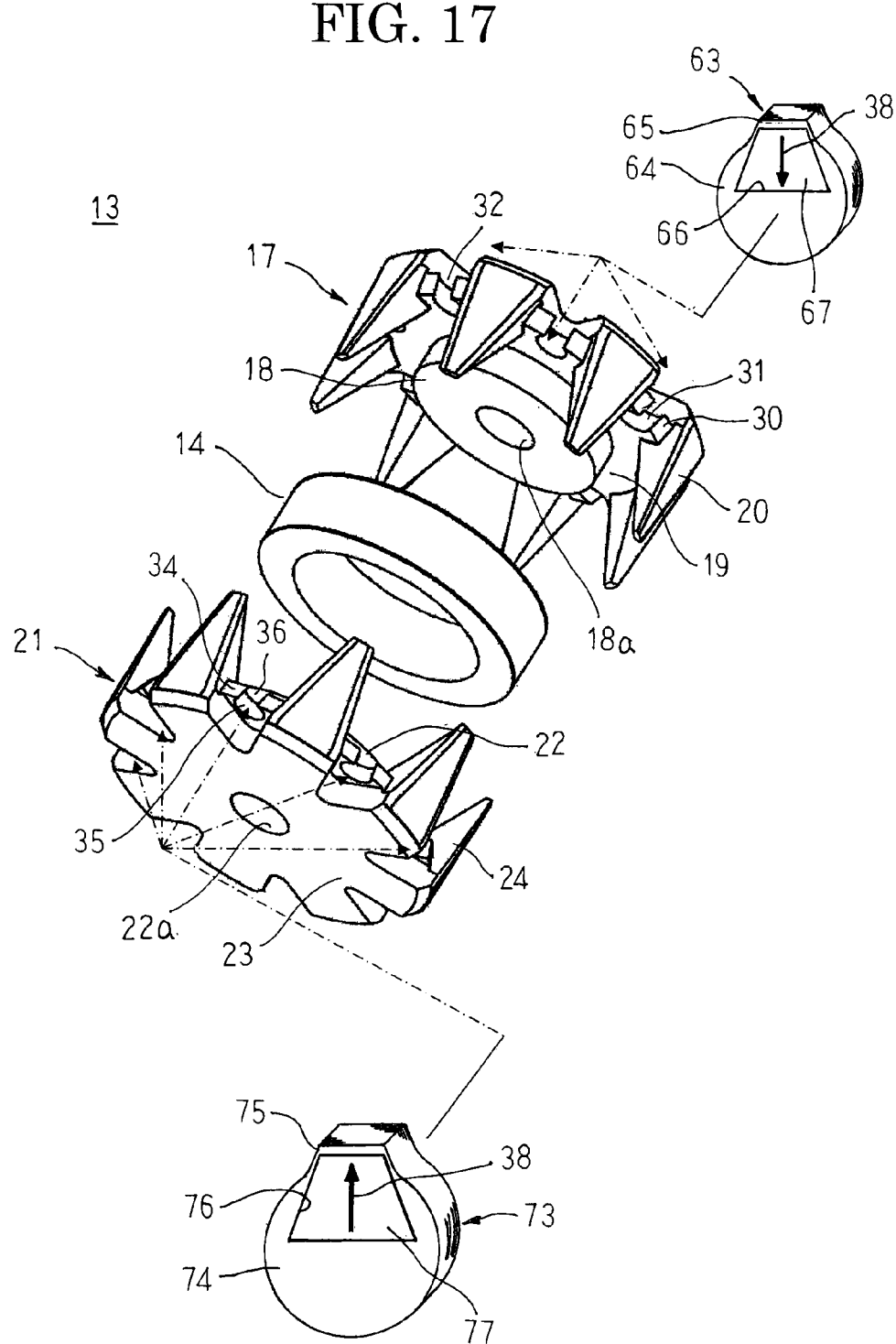
FIG. 17 is an exploded perspective of a rotor that can be used in the automotive alternator according to Embodiment 6 of the present invention.
Figure 18:
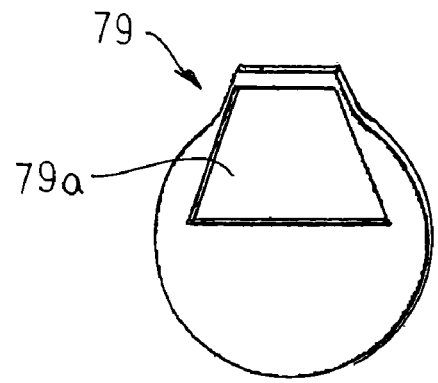
FIG. 18 is a perspective of a thin magnetic plate that constitutes a magnet holder in the automotive alternator according to Embodiment 6 of the present invention.
Figure 19:
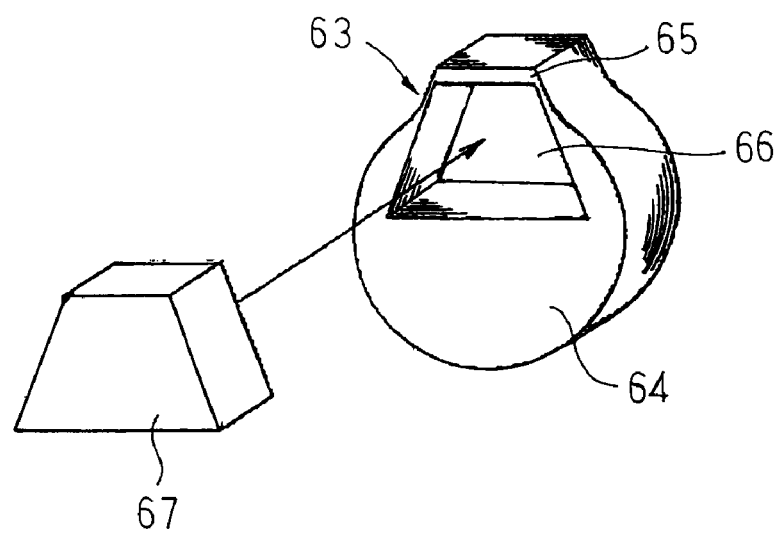
FIG. 19 is a perspective that explains a method for mounting a permanent magnet into the magnet holder in the automotive alternator according to Embodiment 6 of the present invention.
Figure 20:
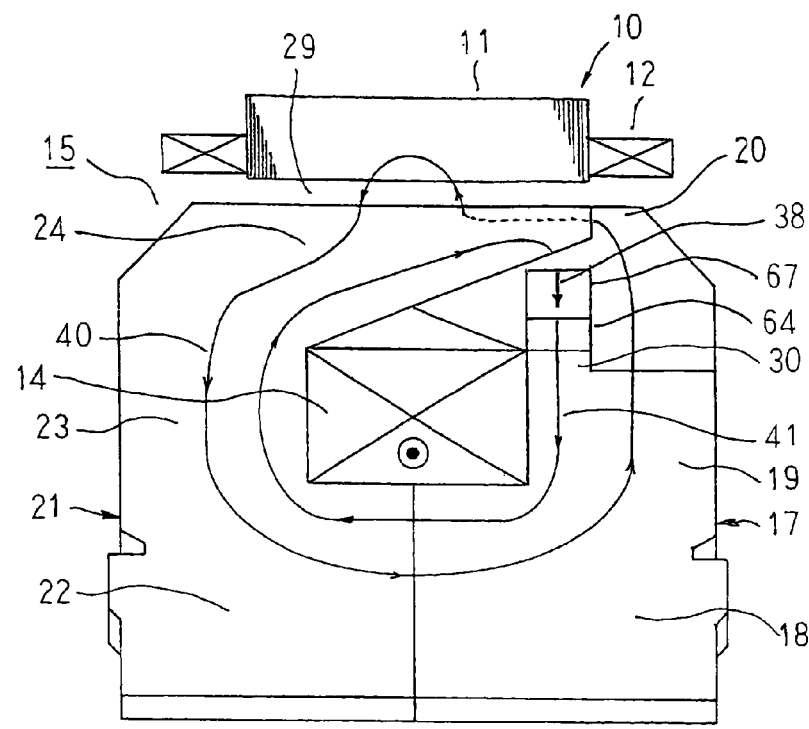
FIG. 20 is a schematic diagram for explaining flow of magnetic flux in the automotive alternator according to Embodiment 6 of the present invention.
Figure 21:
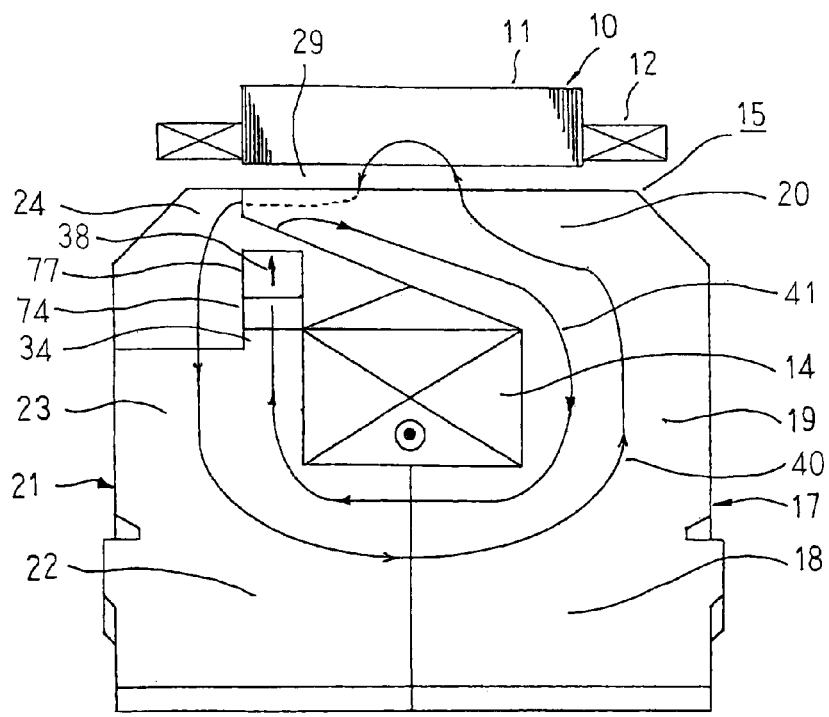
FIG. 21 is a schematic diagram for explaining flow of magnetic flux in the automotive alternator according to Embodiment 6 of the present invention.

FIG. 16 is a cross section that schematically shows an automotive alternator according to Embodiment 6 of the present invention, FIG. 17 is an exploded perspective of a rotor that can be used in the automotive alternator according to Embodiment 6 of the present invention, FIG. 18 is a perspective of a thin magnetic plate that constitutes a magnet holder in the automotive alternator according to Embodiment 6 of the present invention, FIG. 19 is a perspective that explains a method for mounting a permanent magnet into the magnet holder in the automotive alternator according to Embodiment 6 of the present invention, and FIGS. 20 and 21 are respective schematic diagrams for explaining flow of magnetic flux in the automotive alternator according to Embodiment 6 of the present invention.

In FIGS. 16 through 19, an automotive alternator 201 includes: a case 4 that is constituted by a front bracket 2 and a rear bracket 3 that are each made of aluminum so as to have an approximate cup shape; a rotor 13 that is rotatably disposed inside the case 4 such that a shaft 16 is supported by means of bearings 5 in the case 4; a pulley 6 that is fixed to an end portion of the shaft 16 that projects outward at a front end of the case 4; fans 7 that are fixed to first and second axial end surfaces of the rotor 13; a stator 10 that is fixed to the case 4 so as to surround an outer circumference of the rotor 13 so as to have a constant air gap 29 relative to the rotor 13; a pair of slip rings 8 that are fixed to a rear end of the shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is installed in the stator core 11, and in which an alternating current arises due to changes in magnetic flux from a field coil 14 (described below) that accompany rotation of the rotor 13.

The rotor 13 includes: a field coil 14 that generates magnetic flux on passage of an excitation current; a pole core 15 that is disposed so as to cover the field coil 14 and in which magnetic poles are formed by that magnetic flux; and the shaft 16 that is fitted through a central axial position of the pole core 15.

The pole core 15 is constructed so as to be divided into first and second pole core bodies 17 and 21 that are each prepared by a cold forging manufacturing method using a low carbon steel such as S10C, for example.

The first pole core body 17 has: a first boss portion 18 that has an outer circumferential surface that has a cylindrical shape, and in which a shaft insertion aperture 18a is formed so as to pass through at a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially.

The second pole core body 21 has: a second boss portion 22 that has an outer circumferential surface that has a cylindrical shape, and in which a shaft insertion aperture 22a is formed so as to pass through at a central axial position; a thick ring-shaped second yoke portion 23 that is disposed so as to extend radially outward from a second end edge portion of the second boss portion 22; and second claw-shaped magnetic pole portions 24 that are disposed so as to extend toward a first axial end from outer circumferential portions of the second yoke portion 23. Eight, for example, second claw-shaped magnetic pole portions 24 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially.

The first and second pole core bodies 17 and 21 that are configured in this manner are fixed to the shaft 16 that has been fitted through the shaft insertion apertures 18a and 22a such that the first and second claw-shaped magnetic pole portions 20 and 24 alternately intermesh and a second end surface of the first boss portion 18 is abutted to a first end surface of the second boss portion 22. The field coil 14, which has been wound onto a bobbin (not shown), is mounted in a space that is surrounded by the first and second boss portions 18 and 22, the first and second yoke portions 19 and 23, and the first and second claw-shaped magnetic pole portions 20 and 24. Here, the first and second boss portions 18 and 22 and the first and second yoke portions 19 and 23 correspond to a boss portion and first and second yoke portions of the pole core 15.

First magnet holding seats 30 that function as a permanent magnet holding portion are formed integrally on the first pole core body 17 by a cold forging manufacturing method. These first magnet holding seats 30 are disposed integrally so as to project on outer circumferential surfaces of the first yoke portion 19 that face inner circumferential surfaces near each of the tip ends of the second claw-shaped magnetic pole portions 24. First magnet holding apertures 31 are formed on the first magnet holding seats 30 so as to have aperture centers that are oriented axially so as to pass through from a first axial end to a second axial end, and such that cross sections that are perpendicular to the aperture centers have C-shaped arc shapes that open radially outward over an entire length that extends from the first axial end to the second end. First axial openings 32 that open the first magnet holding apertures 31 radially outward over the entire length that extends from the first axial end to the second end face the inner circumferential surfaces near the tip ends of the second claw-shaped magnetic pole portions 24.

First magnet holders 63 that function as a magnet holding member are prepared into prismatic bodies that include: arc-shaped interfitting portions 64 that have C-shaped cross sections that conform to inner radial shapes of the first magnet holding apertures 31; protruding portions 65 that have trapezoidal cross sections that protrude radially outward integrally from chord portions of the arc shapes of the intermitting portions 64; and magnet mounting apertures 66 that have trapezoidal aperture shapes that pass through the interfitting portions 64 and the protruding portions 65 from a first axial end to a second axial end. The first magnet holders 63 are prepared by laminating and integrating a predetermined number of press-formed thin magnetic plates 79. The thin magnetic plates 79 have external shapes in which a trapezoidal shape protrudes radially outward from a chord portion of a C-shaped arc shape, and aperture portions 79a that constitute the magnet mounting apertures 66 are formed so as to have trapezoidal aperture shapes. First permanent magnets 67 are prepared into prismatic bodies that have external shapes that conform to internal shapes of the magnet mounting apertures 66, in other words, trapezoidal cross sections, and are inserted into the first magnet mounting apertures 66 from an axial direction and held.

The interfitting portions 64 of the first magnet holders 63 are inserted into the first magnet holding apertures 31 from an axial direction and held. Here, the protruding portions 65 protrude through the first axial openings 32 and face the inner circumferential surfaces near the tip ends of the second claw-shaped magnetic pole portions 24. Thus, the first permanent magnets 67 are disposed such that upper edge ends of their trapezoidal cross sections are placed in close proximity to the inner circumferential surfaces near the tip ends of the second claw-shaped magnetic pole portions 24.

Second magnet holding seats 34 that function as a permanent magnet holding portion are formed integrally on the second pole core body 21 by a cold forging manufacturing method. These second magnet holding seats 34 are disposed integrally so as to project on outer circumferential surfaces of the second yoke portion 23 that face inner circumferential surfaces near each of the tip ends of the first claw-shaped magnetic pole portions 20. Second magnet holding apertures 35 are formed on the second magnet holding seats 34 so as to have aperture centers that are oriented axially so as to pass through from a first axial end to a second axial end, and such that cross sections that are perpendicular to the aperture centers have C-shaped arc shapes that open radially outward over an entire length that extends from the first axial end to the second end. Second axial openings 36 that open the second magnet holding apertures 35 radially outward over the entire length that extends from the first axial end to the second end face the inner circumferential surfaces near the tip ends of the first claw-shaped magnetic pole portions 20.

Second magnet holders 73 that function as a magnet holding member are prepared into prismatic bodies that include: interfitting portions 74 that have C-shaped arc-shaped cross sections that conform to inner radial shapes of the second magnet holding apertures 35; protruding portions 75 that have trapezoidal cross sections that protrude radially outward integrally from chord portions of the arc shapes of the interfitting portions 74; and magnet mounting apertures 76 that have trapezoidal aperture shapes that pass through the interfitting portions 74 and the protruding portions 75 from a first axial end to a second axial end. The second magnet holders 73 are prepared by laminating and integrating a predetermined number of press-formed thin magnetic plates 79. The thin magnetic plates 79 have external shapes in which a trapezoidal shape protrudes radially outward from a chord portion of a C-shaped arc shape, and aperture portions 79a that constitute the magnet mounting apertures 76 are formed so as to have trapezoidal aperture shapes. Second permanent magnets 77 are prepared into prismatic bodies that have external shapes that conform to internal shapes of the magnet mounting apertures 76, in other words, trapezoidal cross sections, and are inserted into the second magnet mounting apertures 76 from an axial direction and held.

The interfitting portions 74 of the second magnet holders 73 are inserted into the second magnet holding apertures 35 from an axial direction and held. Here, the protruding portions 75 protrude through the second axial openings 36 and face the inner circumferential surfaces near the tip ends of the first claw-shaped magnetic pole portions 20. Thus, the second permanent magnets 77 are disposed such that upper edge ends of their trapezoidal cross sections are placed in close proximity to the inner circumferential surfaces near the tip ends of the first claw-shaped magnetic pole portions 20.

The first and second permanent magnets 67 and 77 are magnetically oriented so as to have directions of magnetization 38 that are opposite to the orientation of a magnetic field 39 that the field current that flows through the field coil 14 produces in a plane that is perpendicular to a central axis of the rotor 13. In other words, if the magnetic field 39 is generated in the direction of the arrow as shown in FIG. 16 when an electric current is passed through the field coil 14, the first and second permanent magnets 67 and 77 are magnetically oriented in a reverse direction to the magnetic field 39. In this case, the directions of magnetization 38 of the first and second permanent magnets 67 and 77 are oriented radially, and extensions of the directions of magnetization 38 are directed at inner circumferential surfaces near the tip ends of the facing first and second claw-shaped magnetic pole portions 20 and 24. Moreover, in the case of a design in which the orientation of the magnetic field 39 that the field current that flows through the field coil 14 produces is inverted, the first and second permanent magnets 67 and 77 will also be magnetically oriented in a reverse direction.

Next, operation of an automotive alternator 201 that has been configured in this manner will be explained.

First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles.

At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

Next, operation of the magnetic flux will be explained with reference to FIGS. 20 and 21.

First, magnetic flux 40 is generated when an electric current is passed through the field coil 14. This magnetic flux 40 enters tooth portions of the stator core 11 by passing through the air gap 29 from the first claw-shaped magnetic pole portions 20. The magnetic flux 40 then moves circumferentially through a core back portion from the tooth portions of the stator core 11, and enters neighboring second claw-shaped magnetic pole portions 24 by passing through the air gap 29 from the tooth portions that face those second claw-shaped magnetic pole portions 24. Next, the magnetic flux 40 that has entered the second claw-shaped magnetic pole portions 24 passes through the second yoke portion 23, the second boss portion 22, the first boss portion 18, and the first yoke portion 19, and reaches the first claw-shaped magnetic pole portions 20. Now, in a conventional Lundell rotor, because the first and second pole core bodies are at their design limit, they are magnetically saturated by the magnetic field that is generated by the field coil, reducing magnetic flux that is generated by the rotor.

In Embodiment 6, the first and second permanent magnets 67 and 77 are magnetically oriented so as to be opposite to the orientation of the magnetic field 39 that is generated by the field coil 14. Thus, the orientation of the magnetic field that originates from the first and second permanent magnets 67 and 77 is in a reverse direction to the magnetic field 39 that is generated by the field coil 14. To interlink with the stator core 11, it is necessary for the magnetic flux 41 that originates from these first and second permanent magnets 67 and 77 to make a round trip across the air gap 29, which has a large magnetic resistance. The first and second permanent magnets 67 and 77 are disposed radially inside the second and first claw-shaped magnetic pole portions 24 and 20, and are disposed so as to circuit in a shorter magnetic path length than the inner circumferential surface sides of the first and second claw-shaped magnetic pole portions 20 and 24. Thus, a large portion of the magnetic flux 41 forms a closed magnetic circuit inside the rotor 13 without going around through the stator core 11.

In other words, the magnetic flux 41 that originates from the first permanent magnets 67 passes from the first magnet holding seats 30 through the first yoke portion 19, the first boss portion 18, the second boss portion 22, the second yoke portion 23, and the second claw-shaped magnetic pole portions 24, and returns to the first permanent magnets 67. The magnetic flux 41 that originates from the second permanent magnets 77 enters the first claw-shaped magnetic pole portions 20 through the gap, passes through the first yoke portion 19, the first boss portion 18, the second boss portion 22, the second yoke portion 23, and the second magnet holding seat 34, and returns to the second permanent magnets 77.

Thus, the magnetic flux 41 that originates from the first and second permanent magnets 67 and 77 is in a reverse direction from the magnetic flux 40 that originates from the field coil 14, enabling the magnetic flux density of the magnetic bodies that constitute the first and second pole core bodies 17 and 21 to be reduced significantly, thereby enabling magnetic saturation to be relieved.

According to Embodiment 6, because the first and second permanent magnets 67 and 77 are disposed, magnetic saturation is relieved and magnetic flux that interlinks with the stator 10 is increased, enabling generated power to be increased. In particular, generated power can be increased significantly in a low-speed idling region where magnetic saturation is pronounced.

Because the first and second permanent magnets 67 and 77 are disposed so as to face inner circumferential surfaces of the first and second claw-shaped magnetic pole portions 20 and 24, the first and second permanent magnets 67 and 77 are positioned radially inside an outermost circumferential surface of the rotor 13. Thus, stator slot harmonics are confined to outermost circumferential portions of the first and second claw-shaped magnetic pole portions 20 and 24, and do not act to heat the first and second permanent magnets 67 and 77 by direct induction. As a result, the first and second permanent magnets 67 and 77 are prevented from being heated and thermally demagnetized.

Because the first and second permanent magnets 67 and 77 are disposed so as to face the inner circumferential surfaces of the first and second claw-shaped magnetic pole portions 20 and 24, the magnetic circuits of the first and second permanent magnets 67 and 77 are closed magnetic circuits inside the rotor, eliminating magnetic flux components that interlink with the stator 10. Thus, the occurrence of voltages induced by the first and second permanent magnets 67 and 77 during no-load de-energization is suppressed. As a result, the magnet volume of the first and second permanent magnets 67 and 77 can be increased.

The first and second permanent magnets 67 and 77 are mounted onto the first and second yoke portions 19 and 23. Thus, because the first and second permanent magnets 67 and 77 are positioned radially inside the first and second claw-shaped magnetic pole portions 20 and 24, centrifugal forces that act on the first and second permanent magnets 67 and 77 are reduced, enabling the holding construction for the first and second permanent magnets 67 and 77 to be simplified. Because the first and second permanent magnets 67 and 77 are not affected by the first and second claw-shaped magnetic pole portions 20 and 24, which are displaced greatly relative to centrifugal force, holding of the first and second permanent magnets 67 and 77 is facilitated. Because of these facts, the holding reliability for the first and second permanent magnets 67 and 77 is improved.

Now, because the first and second pole core bodies 17 and 21 are prepared using a cold forging manufacturing method, high-precision magnet holding shapes are difficult to achieve. Thus, in order to achieve high-precision magnet holding shapes, it has been necessary to apply milling to the first and second pole core bodies 17 and 21 that have been prepared by the cold forging manufacturing method using an NC milling machine, etc.

In Embodiment 6, because the aperture shapes of the first and second magnet holding apertures 31 and 35 for holding the magnets are tubular shapes that have C-shaped arc-shaped cross sections, first and second magnet holding apertures 31 and 35 that have high-precision aperture dimensions can be formed by applying simple and convenient additional milling using a rotary cutting tool such as a drill or a reamer, etc., to the first and second pole core bodies 17 and 21 that have been prepared by the cold forging manufacturing method. Thus, interfitting surfaces on the first and second magnet holding apertures 31 and 35 can be prepared by cutting using a rotary cutting tool, etc., making three-dimensional cutting processes that use NC milling machines, etc., unnecessary, enabling manufacturing time to be shortened and manufacturing costs to be reduced.

Because milling precision of the interfitting surfaces of the first and second magnet holding apertures 31 and 35 can be raised, the first and second magnet holders 63 and 73 into which the first and second permanent magnets 67 and 77 have been mounted internally can be held firmly in the first and second magnet holding apertures 31 and 35 in a stable state without wobbling. Thus, even if the rotor 13 rotates at high speed, situations such as the first and second magnet holders 63 and 73 dislodging from the first and second magnet holding apertures 31 and 35 and being thrown and damaging the first and second permanent magnets 67 and 77 can be avoided.

Because the first and second permanent magnets 67 and 77 are mounted internally into the first and second magnet holders 63 and 73, the occurrence of cracking and chipping of the first and second magnet holders 63 and 73 can be suppressed even if the automotive alternator 201 is subjected to vibrations from an automobile engine.

The first and second magnet holding apertures 31 and 35 are prepared into tubular shapes that have C-shaped arc-shaped cross sections so as to have aperture centers that are oriented axially, and the first and second magnet holders 63 and 73 are inserted into the first and second magnet holding apertures 31 and 35 from an axial direction and held. Thus, the holding construction of the magnet holder 63 and 73 is simplified, and mountability is also improved, enabling reductions in production costs and improvements in mass producibility.

Because contact surfaces between the first and second magnet holding apertures 31 and 35 and the first and second magnet holders 63 and 73 are cylindrical surfaces, there are no local concentrations of stress, suppressing the occurrence of damage to the first and second magnet holding seats 30 and 34.

Because the first and second permanent magnets 67 and 77 are prepared into prismatic bodies that have trapezoidal cross sections, the first and second permanent magnets 67 and 77 can be cut from a magnet base material efficiently using an abrasive wheel, increasing material yield.

Because the first and second magnet holders 63 and 73 are prepared by laminating thin magnetic plates 79 that have been punched by press working, the first and second magnet holders 63 and 73, which have complex external shapes constituted by the interfitting portions 64 and 74 that conform to the aperture shapes of the first and second magnet holding apertures 31 and 35 and the protruding portions 65 and 75 that project out through the first and second axial openings 32 and 36, can be prepared easily and with high precision. Thus, the first and second magnet holders 63 and 73 can be held in the first and second magnet holding apertures 31 and 35 without wobbling. The magnet mounting apertures 66 and 76 can also be prepared easily and with high precision. Thus, the first and second permanent magnets 67 and 77 can be held in the first and second magnet holders 63 and 73 without wobbling. In addition, because the interfitting portions 64 and 74 are interposed between the first and second permanent magnets 67 and 77 and the first and second magnet holding seats 30 and 34, magnetic resistance between the two is reduced. Thus, magnetic resistance in the magnet magnetic path decreases, magnet magnetic flux quantity increases, and rotor magnetic saturation alleviation effects are further increased, enabling generated output to be increased.

Now, it is necessary to magnetize the permanent magnets at some stage in the manufacturing of the rotor 13, and it is necessary to demagnetize all devices when handling permanent magnets in a magnetized state. Here, it is preferable that unmagnetized permanent magnets that have been cut from a magnet base material be inserted into the magnet mounting apertures 66 and 76 of the first and second magnet holders 63 and 73 and held, and the unmagnetized permanent magnets subsequently magnetized by applying a magnetic field to the first and second magnet holders 63 and 73 in which the unmagnetized permanent magnets are held. The first and second magnet holders 63 and 73 in which the magnetized permanent magnets (the first and second permanent magnets 67 and 77) are held are then inserted into the first and second magnet holding apertures 31 and 35 from an axial direction and held. In other words, because interfitting portions 64 and 74 that can be gripped are present on the first and second magnet holders 63 and 73 in which the first and second permanent magnets 67 and 77 are held, handling by robots or automatic equipment is facilitated, making it no longer necessary to demagnetize all devices.

In Embodiment 6 above, because the first magnet holders 63 into which the first permanent magnets 67 have been mounted are held in all eight first magnet holding seats 30 that are disposed so as to protrude from portions of the first yoke portion 19 between circumferentially-adjacent first claw-shaped magnetic pole portions 20, and the second magnet holder 73 into which the second permanent magnets 77 have been mounted are held in all eight second magnet holding seats 34 that are disposed so as to protrude from portions of the second yoke portion 23 between circumferentially-adjacent second claw-shaped magnetic pole portions 24, the first and second magnet holders 63 and 73 are arranged at a uniform angular pitch. Thus, the sum total of vectors from the center of the shaft 16 to the center of gravity of each of the first and second magnet holders 63 and 73 is a zero vector, suppressing the occurrence of gravimetric imbalances relative to centrifugal forces that result from disposing the first and second permanent magnets 67 and 77. Here, the center of gravity of a first magnet holder 63 is a center of gravity that includes a first permanent magnet 67 and a first magnet holder 63, and the center of gravity of a second magnet holder 73 is a center of gravity that includes a second permanent magnet 77 and a second magnet holder 73.

Now, in Embodiment 6 above, the first and second magnet holders 63 and 73 are disposed in all of the first and second magnet holding seats 30 and 34, but it is not necessary for the first and second magnet holders 63 and 73 to be disposed in all of the first and second magnet holding seats 30 and 34, and the number of first and second magnet holders 63 and 73 that is disposed may be selected appropriately taking into account required performance and costs. In that case, in order not to generate gravimetric imbalances with respect to centrifugal forces, the first and second magnet holders 63 and 73 should be disposed such that the sum total of vectors from the center of the shaft 16 to the center of gravity of each of the first and second magnet holders 63 and 73 including the first and second permanent magnets 67 and 77 is a zero vector. In that case, because the magnetic flux from the first and second permanent magnets 67 and 77 is magnetically closed inside the rotor, magnetic imbalances will also not arise with respect to the stator.

Figure 22:
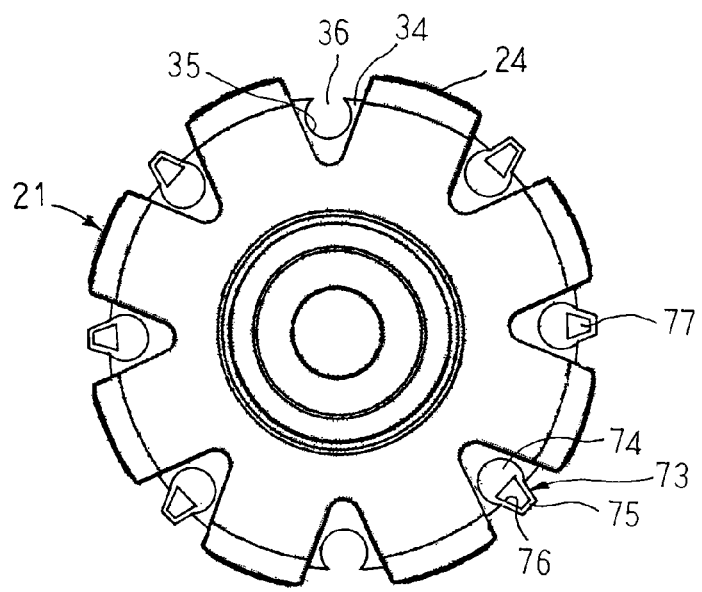
FIG. 22 is an end elevation of a rotor that shows a first preferred variation of the automotive alternator according to Embodiment 6 of the present invention.

For example, if required performance and costs are taken into account and it is decided that the number of each of the first and second magnet holders 63 and 73 to be disposed is six, then six first and second magnet holders 63 and 73 should be disposed in the first and second magnet holding seats 30 and 34 at positions that form point symmetry with respect to the center of the shaft 16, as shown in FIG. 22, in other words, excluding two first and second magnet holding seats 30 and 34 at positions that are separated by 180 degrees circumferentially. In this manner, the sum total of vectors from the center of the shaft 16 to the center of gravity of each of the first and second magnet holders 63 and 73 including the first and second permanent magnets 67 and 77 will be a zero vector. If it is decided that the number of each of the first and second magnet holders 63 and 73 to be disposed is four, then the first and second magnet holders 63 and 73 should respectively be disposed in first and second magnet holding seats 30 and 34 at a uniform angular pitch of 90 degrees. In this manner, the sum total of vectors from the center of the shaft 16 to the center of gravity of each of the first and second magnet holders 63 and 73 including the first and second permanent magnets 67 and 77 will also be a zero vector.

In Embodiment 6 above, the first and second magnet holding seats 30 and 34 that hold the first and second magnet holders 63 and 73 are disposed between all of the circumferentially-adjacent first and second claw-shaped magnetic pole portions 20 and 24, but it is not necessary for the first and second magnet holding seats 30 and 34 that hold the first and second magnet holders 63 and 73 to be disposed between all of the circumferentially-adjacent first and second claw-shaped magnetic pole portions 20 and 24, and the number of first and second magnet holding seats 30 and 34 that is disposed may be selected appropriately taking into account required performance and costs. In that case, in order not to generate gravimetric imbalances with respect to centrifugal forces, the first and second magnet holding seats 30 and 34 should be disposed such that the sum total of vectors from the center of the shaft 16 to the magnet holding seat overall center of gravity of each of the first and second magnet holding seats 30 and 34 that hold the first and second magnet holders 63 and 73 is a zero vector. Here, the magnet holding seat overall center of gravity is a center of gravity that includes a first magnet holding seat 30, a first permanent magnet 67, and a first magnet holder 63, and a center of gravity that includes a second magnet holding seat 34, a second permanent magnet 77, and a second magnet holder 73. In that case, because the magnetic flux from the first and second permanent magnets 67 and 77 is magnetically closed inside the rotor, magnetic imbalances will also not arise with respect to the stator.

Figure 23:
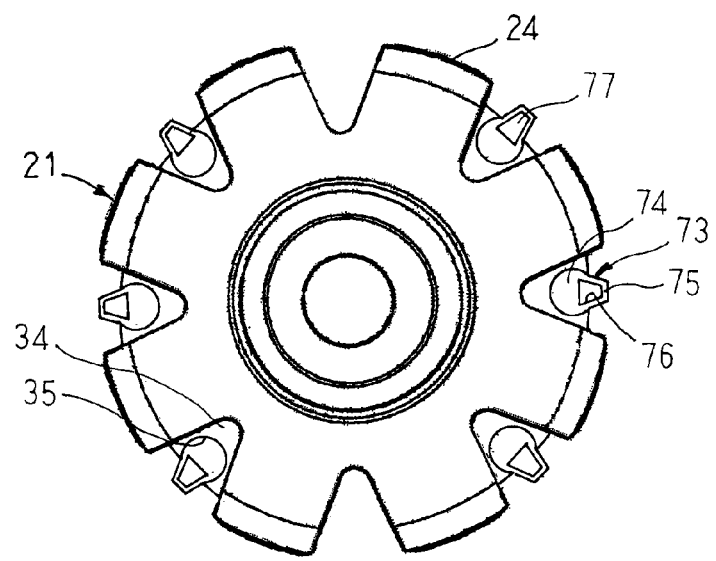
FIG. 23 is an end elevation of a rotor that shows a second preferred variation of the automotive alternator according to Embodiment 6 of the present invention.

For example, if required performance and costs are taken into account and it is decided that the number of each of the first and second magnet holding seats 30 and 34 that hold the first and second magnet holders 63 and 73 to be disposed is six, then the first and second magnet holding seats 30 and 34 should be disposed at positions that form point symmetry with respect to the center of the shaft 16, as shown in FIG. 23, in other words, at six positions excluding two positions that are separated by 180 degrees circumferentially, and the first and second magnet holders 63 and 73 in which the first and second permanent magnets 67 and 77 are held should be disposed in the respective first and second magnet holding seats 30 and 34. In this manner, the sum total of vectors from the center of the shaft 16 to the magnet holding seat overall center of gravity of each of the first and second magnet holding seats 30 and 34 will be a zero vector. If it is decided that the number of each of the first and second magnet holding seats 30 and 34 that hold the first and second magnet holders 63 and 73 to be disposed is four, then the four first and second magnet holding seats 30 and 34 should respectively be disposed at a uniform angular pitch of 90 degrees, and the first and second magnet holders 63 and 73 in which the first and second permanent magnets 67 and 77 are held should be disposed in the respective first and second magnet holding seats 30 and 34. In this manner, the sum total of vectors from the center of the shaft 16 to the magnet holding seat overall center of gravity of each of the first and second magnet holding seats 30 and 34 will also be a zero vector.

In Embodiment 6 above, the protruding portions 65 and 75 of the first and second magnet holders 63 and 73 are formed so as to have trapezoidal cross sections, but the cross sections of the protruding portions are not limited to a trapezoidal shape, and the cross sections may also be quadrilaterals of square or rectangular shape. Moreover, it goes without saying that chamfering or rounding may also be applied to corner portions of the quadrilateral cross sections.

In Embodiment 6 above, the first and second permanent magnets 67 and 77 are prepared into prismatic bodies that have trapezoidal cross sections, but the first and second permanent magnets 67 and 77 are not limited to prismatic bodies that have trapezoidal cross sections. If the prismatic bodies have cross sections that are quadrilaterals such as trapezoids, squares, rectangles, etc., for example, the first and second permanent magnets 67 and 77 can be cut out of the magnet base material efficiently, enabling material yield to be increased. Moreover, it goes without saying that chamfering or rounding may also be applied to corner portions of the quadrilateral cross sections. The magnet mounting apertures 66 and 76 will also be formed so as to have internal shapes that have quadrilateral cross sections that conform to external shapes of first and second permanent magnets 67 and 77 that have quadrilateral cross sections.

In Embodiment 6 above, the first and second magnet holders 63 and 73 are prepared by laminating a predetermined number of thin magnetic plates 79, but first and second magnet holders may also be prepared as single parts using solid bodies of magnetic material.

In Embodiment 6 above, the first and second magnet holding apertures 31 and 35 are formed on the first and second magnet holding seats 30 and 34 so as to pass through from a first axial end to a second axial end so as to have aperture centers that are oriented axially, and so as to have arc shapes that have C-shaped cross sections that open radially outward, but the first and second magnet holding apertures do not necessarily have to pass through from the first axial end to the second end, provided that at least one of the first axial end or the second end is open.

It is not absolutely necessary to orient the aperture centers of the first and second magnet holding apertures 31 and 35 axially, and they may also be inclined relative to an axial direction. For example, it is more preferable if aperture centers of first and second magnet holding apertures are made approximately parallel to inner circumferential surfaces near tip ends of facing second and first claw-shaped magnetic pole portions.

Embodiment 7

Figure 24:
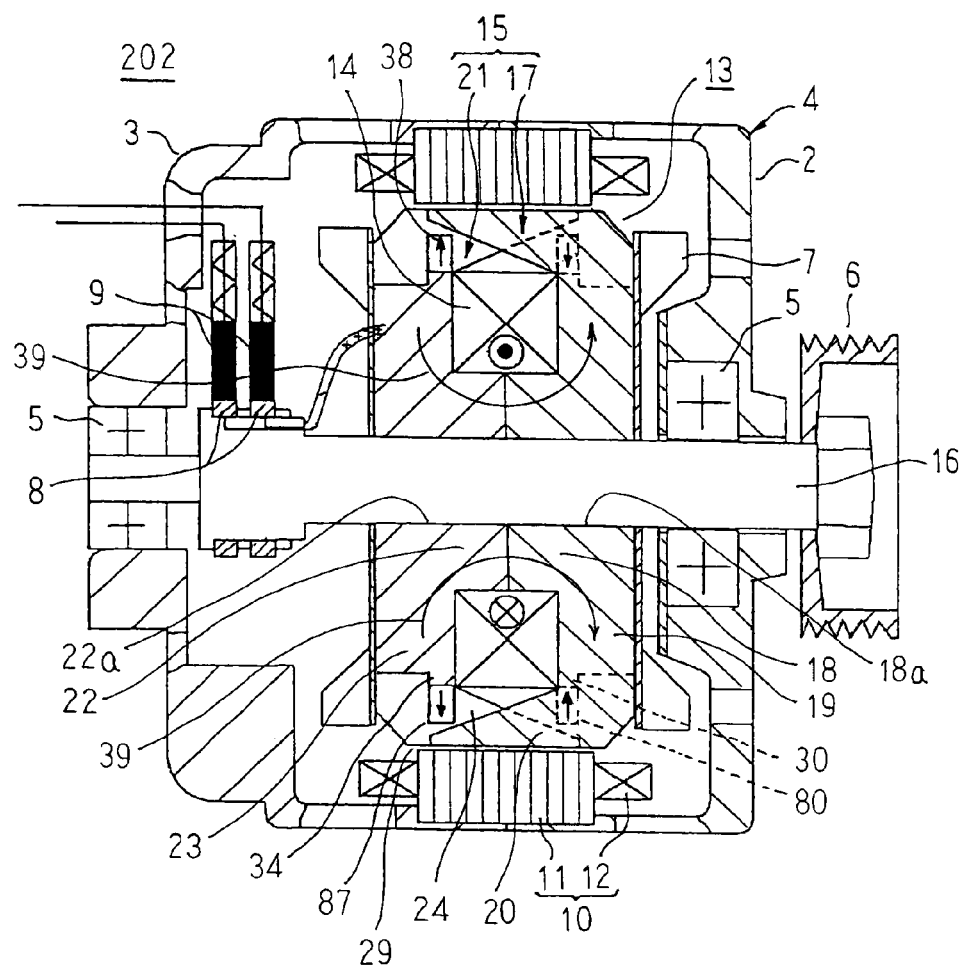
FIG. 24 is a cross section that schematically shows an automotive alternator according to Embodiment 7 of the present invention.
Figure 25:
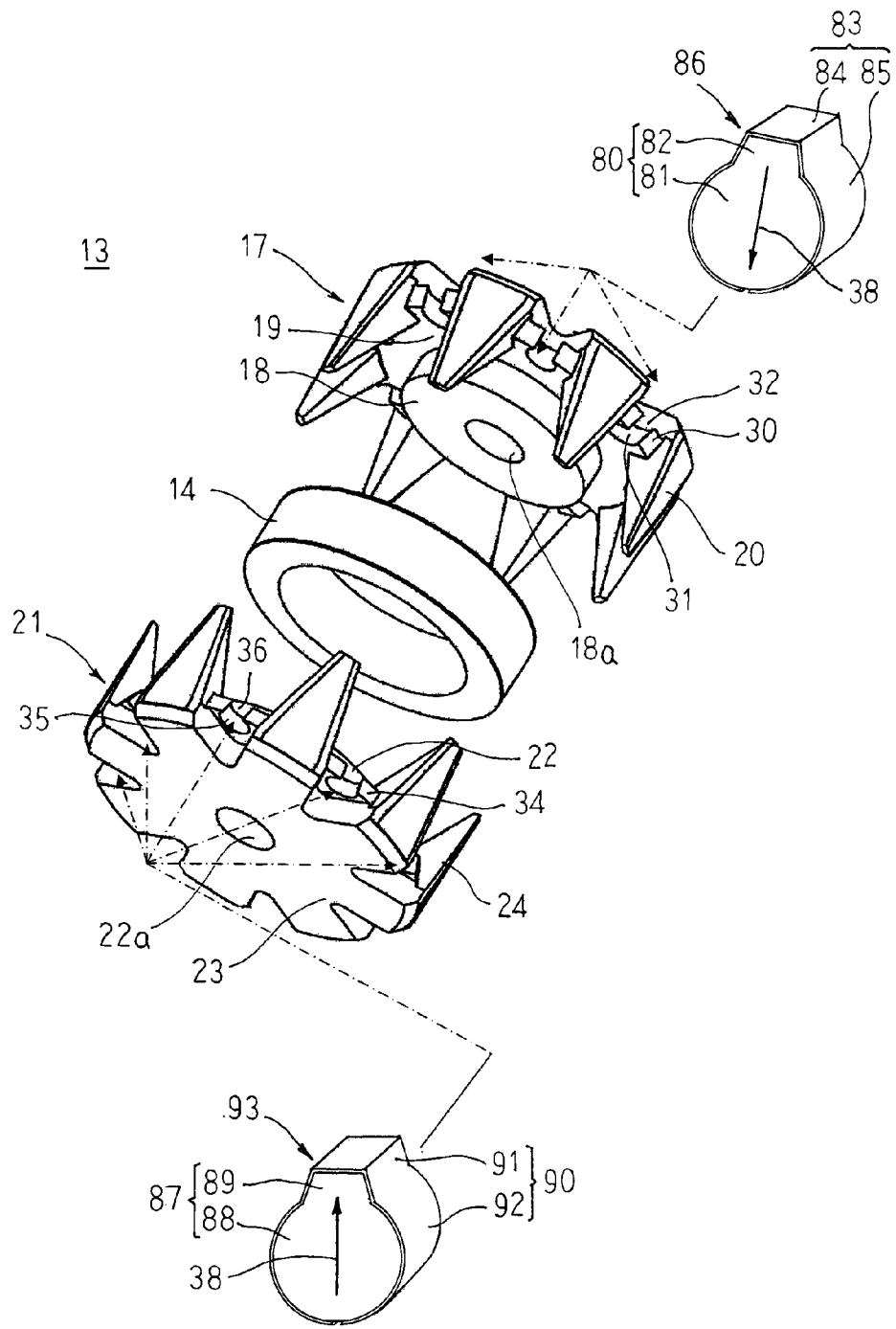
FIG. 25 is an exploded perspective of a rotor that can be used in the automotive alternator according to Embodiment 7 of the present invention.
Figure 26A:
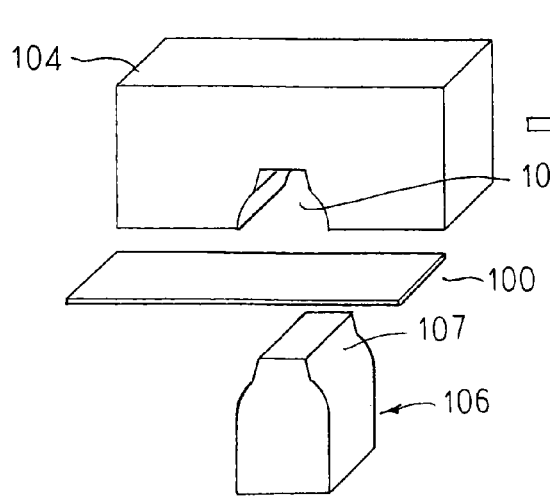
FIGS. 26A through 26D are process diagrams that explain a method for manufacturing a magnet case that can be used in the automotive alternator according to Embodiment 7 of the present invention.
Figure 26B:
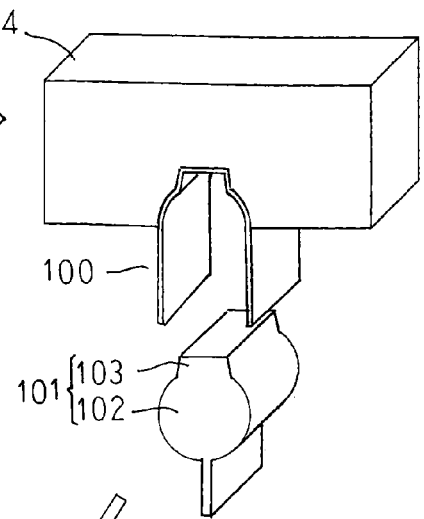
Figure 26C:
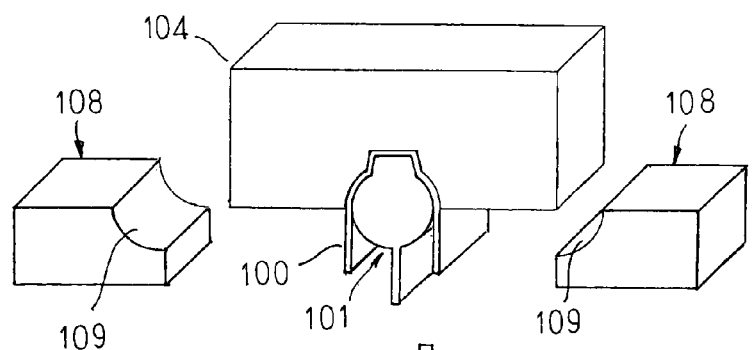
Figure 26D:
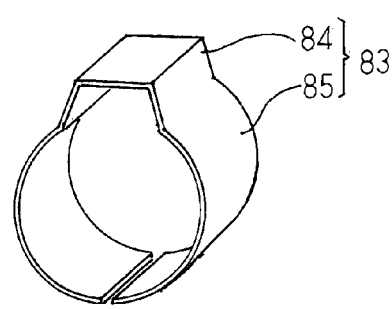
Figure 27:
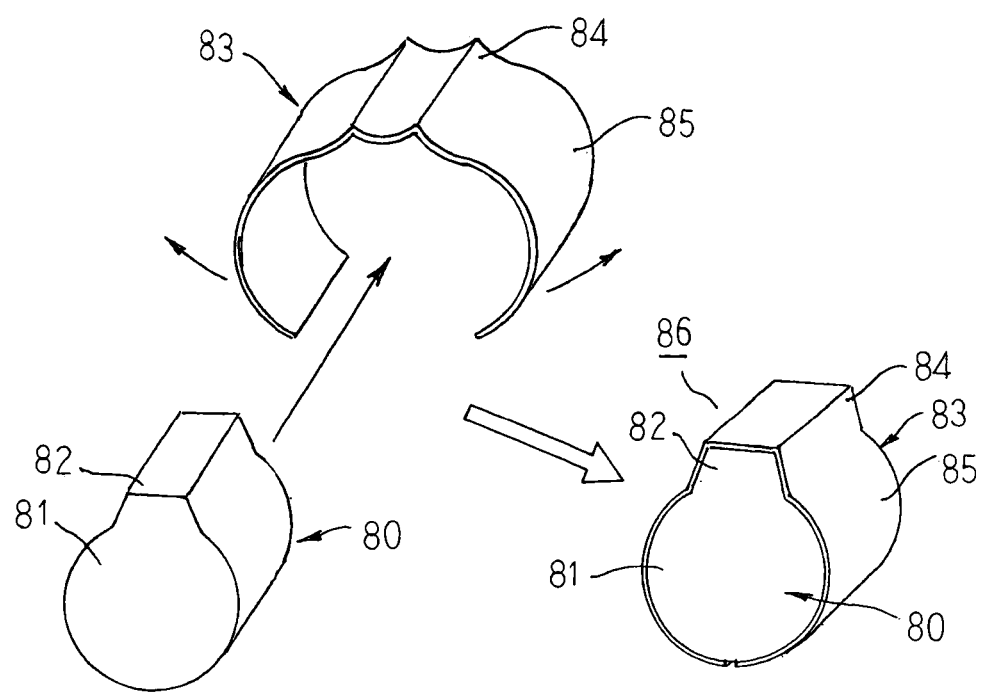
FIG. 27 is a diagram that explains a method for mounting a permanent magnet into the magnet case in the automotive alternator according to Embodiment 7 of the present invention.
Figure 28:
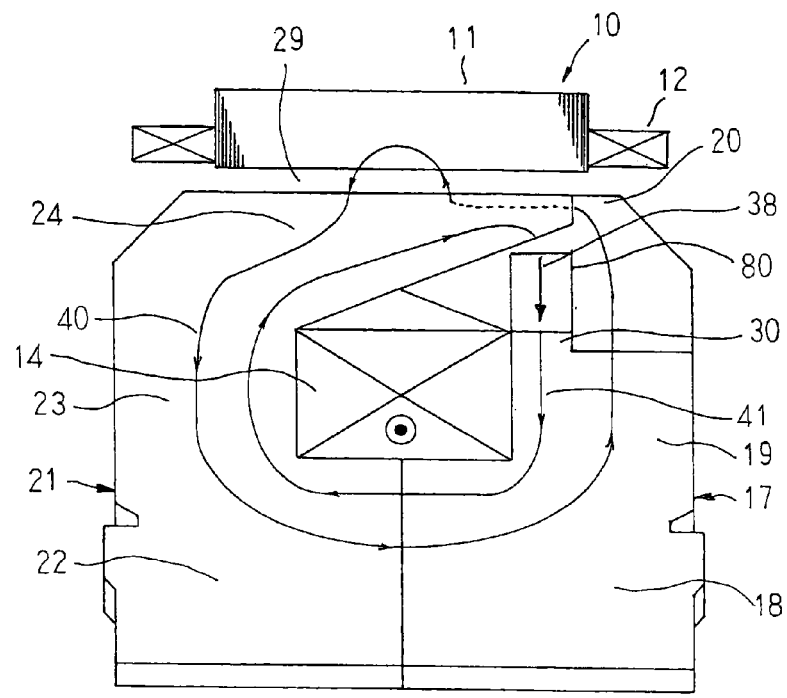
FIG. 28 is a schematic diagram for explaining flow of magnetic flux in the automotive alternator according to Embodiment 7 of the present invention.
Figure 29:
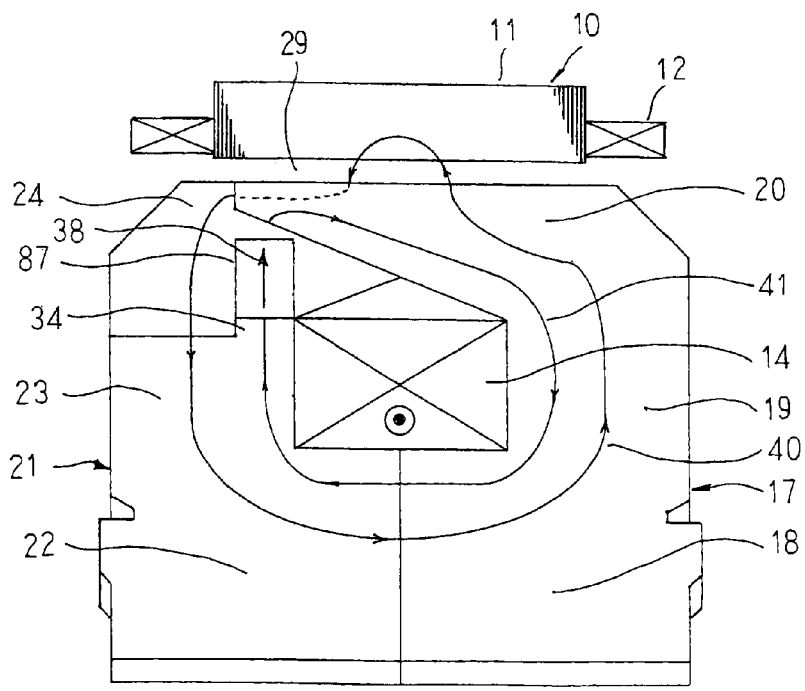
FIG. 29 is a schematic diagram for explaining flow of magnetic flux in the automotive alternator according to Embodiment 7 of the present invention.

FIG. 24 is a cross section that schematically shows an automotive alternator according to Embodiment 7 of the present invention, FIG. 25 is an exploded perspective of a rotor that can be used in the automotive alternator according to Embodiment 7 of the present invention, FIGS. 26A through 26D are process diagrams that explain a method for manufacturing a magnet case that can be used in the automotive alternator according to Embodiment 7 of the present invention, FIG. 27 is a diagram that explains a method for mounting a permanent magnet into the magnet case in the automotive alternator according to Embodiment 7 of the present invention, and FIGS. 28 and 29 are respective schematic diagrams for explaining flow of magnetic flux in the automotive alternator according to Embodiment 7 of the present invention.

In FIGS. 24 through 25, an automotive alternator 202 includes: a case 4 that is constituted by a front bracket 2 and a rear bracket 3 that are each made of aluminum so as to have an approximate cup shape; a rotor 13 that is rotatably disposed inside the case 4 such that a shaft 16 is supported by means of bearings 5 in the case 4; a pulley 6 that is fixed to an end portion of the shaft 16 that projects outward at a front end of the case 4; fans 7 that are fixed to first and second axial end surfaces of the rotor 13; a stator 10 that is fixed to the case 4 so as to surround an outer circumference of the rotor 13 so as to have a constant air gap 29 relative to the rotor 13; a pair of slip rings 8 that are fixed to a rear end of the shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is installed in the stator core 11, and in which an alternating current arises due to changes in magnetic flux from a field coil 14 (described below) that accompany rotation of the rotor 13.

The rotor 13 includes: a field coil 14 that generates magnetic flux on passage of an excitation current; a pole core 15 that is disposed so as to cover the field coil 14 and in which magnetic poles are formed by that magnetic flux; and the shaft 16 that is fitted through a central axial position of the pole core 15.

The pole core 15 is constructed so as to be divided into first and second pole core bodies 17 and 21 that are each prepared by a cold forging manufacturing method using a low carbon steel such as S10C, for example.

The first pole core body 17 has: a first boss portion 18 that has an outer circumferential surface that has a cylindrical shape, and in which a shaft insertion aperture 18a is formed so as to pass through at a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially.

The second pole core body 21 has: a second boss portion 22 that has an outer circumferential surface that has a cylindrical shape, and in which a shaft insertion aperture 22a is formed so as to pass through at a central axial position; a thick ring-shaped second yoke portion 23 that is disposed so as to extend radially outward from a second end edge portion of the second boss portion 22; and second claw-shaped magnetic pole portions 24 that are disposed so as to extend toward a first axial end from outer circumferential portions of the second yoke portion 23. Eight, for example, second claw-shaped magnetic pole portions 24 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially.

The first and second pole core bodies 17 and 21 that are configured in this manner are fixed to the shaft 16 that has been fitted through the shaft insertion apertures 18a and 22a such that the first and second claw-shaped magnetic pole portions 20 and 24 alternately intermesh and a second end surface of the first boss portion 18 is abutted to a first end surface of the second boss portion 22. The field coil 14, which has been wound onto a bobbin (not shown), is mounted in a space that is surrounded by the first and second boss portions 18 and 22, the first and second yoke portions 19 and 23, and the first and second claw-shaped magnetic pole portions 20 and 24. Here, the first and second boss portions 18 and 22 and the first and second yoke portions 19 and 23 correspond to a boss portion and first and second yoke portions of the pole core 15.

First magnet holding seats 30 that function as a permanent magnet holding portion are formed integrally on the first pole core body 17 by a cold forging manufacturing method. These first magnet holding seats 30 are disposed integrally so as to project on outer circumferential surfaces of the first yoke portion 19 that face inner circumferential surfaces near each of the tip ends of the second claw-shaped magnetic pole portions 24. First magnet holding apertures 31 are formed on the first magnet holding seats 30 so as to have aperture centers that are oriented axially so as to pass through from a first axial end to a second axial end, and such that cross sections that are perpendicular to the aperture centers have C-shaped arc shapes that open radially outward over an entire length that extends from the first axial end to the second end. First axial openings 32 that open the first magnet holding apertures 31 radially outward over the entire length that extends from the first axial end to the second end face the inner circumferential surfaces near the tip ends of the second claw-shaped magnetic pole portions 24.

First permanent magnets 80 are prepared into prismatic bodies that include: arc-shaped interfitting portions 81 that have C-shaped cross sections; and protruding portions 82 that have trapezoidal cross sections that protrude radially outward integrally from chord portions of the arc shapes of the intermitting portions 81. Radii of the interfitting portions 81 are smaller than radii of the first magnet holding apertures 31 by a distance approximately equivalent to a plate thickness of a first magnet case 83.

First magnet cases 83 that function as a magnet holding member are prepared by flex molding a stainless alloy flat plate, as described below, and include: a crown portion 84 that has an angular bracket-shaped cross section that has an internal shape that conforms to an external shape of the protruding portions 82; and a pair of wing portions 85 that extend outward from two ends of the angular C shape of the crown portions 84 in shapes that cover a circumference of the interfitting portions 81, and that are respectively formed so as to have an arc-shaped cross sectional shape that has a predetermined radius of curvature. The radii of curvature of the inner circumferential surfaces of the wing portions 85 are slightly smaller than the radii of curvature of the outer circumferential surfaces of the interfitting portions 81. These first magnet cases 83 are mounted so as to be fitted over the first permanent magnets 80 with the crown portions 84 fitted onto the protruding portions 82. Here, the curved state of the pair of wing portions 85 is expanded so as to press the outer circumferential surfaces of the interfitting portions 81 by their own elastic force, and a predetermined clearance is ensured between the leading ends of the pair of wing portions 85. At least a central portion of the arc-shaped cross sections of each of the wing portions 85 are separated from the outer circumferential surfaces of the interfitting portions 81. First magnet modules 86 are thereby assembled in which the first permanent magnets 80 are held inside the first magnet cases 83.

The interfitting portions 81 of the first magnet modules 86 that have been covered by the pair of wing portions 85 are inserted into the first magnet holding apertures 31 from an axial direction and held. Here, the curved state of the pair of wing portions 85 is expanded further in such a way that the gap between the leading ends of the pair of wing portions 85 is reduced, while the central portions of the arc-shaped cross sections are placed in close proximity to the outer circumferential surfaces of the interfitting portions 81, and the radius of curvature approaches the radius of curvature of the outer circumferential surfaces of the interfitting portions 81, increasing close-contact surface area of the first permanent magnets 80 with the outer circumferential surfaces of the interfitting portions 81. The first magnet modules 86 are thereby held in a press-fitted state in the first magnet holding apertures 31. At this point, the wing portions 85 are interposed between the first magnet holding apertures 31 and the interfitting portions 81 with their forces of recovery stored, and the first permanent magnets 80 are elastically supported in the first magnet holding apertures 31. The protruding portions 82 that have been covered by the crown portions 84 project outward through the first axial openings 32, and face the inner circumferential surfaces near the tip ends of the second claw-shaped magnetic pole portions 24.

Second magnet holding seats 34 that function as a permanent magnet holding portion are formed integrally on the second pole core body 21 by a cold forging manufacturing method. These second magnet holding seats 34 are disposed integrally so as to project on outer circumferential surfaces of the second yoke portion 23 that face inner circumferential surfaces near each of the tip ends of the first claw-shaped magnetic pole portions 20. Second magnet holding apertures 35 are formed on the second magnet holding seats 34 so as to have aperture centers that are oriented axially so as to pass through from a first axial end to a second axial end, and such that cross sections that are perpendicular to the aperture centers have C-shaped arc shapes that open radially outward over an entire length that extends from the first axial end to the second end. Second axial openings 36 that open the second magnet holding apertures 35 radially outward over the entire length that extends from the first axial end to the second end face the inner circumferential surfaces near the tip ends of the first claw-shaped magnetic pole portions 20.

Second permanent magnets 87 are prepared into prismatic bodies that include: arc-shaped interfitting portions 88 that have C-shaped cross sections; and protruding portions 89 that have trapezoidal cross sections that protrude radially outward integrally from chord portions of the arc shapes of the interfitting portions 88. Radii of the interfitting portions 88 are smaller than radii of the second magnet holding apertures 35 by a distance approximately equivalent to a plate thickness of a second magnet case 90.

Second magnet cases 90 that function as a magnet holding member are similarly prepared by flex molding a stainless alloy flat plate, and include: a crown portion 91 that has an angular bracket-shaped cross section that has an internal shape that conforms to an external shape of the protruding portions 89; and a pair of wing portions 92 that extend outward from two ends of the angular C shape of the crown portions 91, and that are respectively formed so as to have an arc-shaped cross sectional shape that has a predetermined radius of curvature. The radii of curvature of the inner circumferential surfaces of the wing portions 92 are slightly smaller than the radii of curvature of the outer circumferential surfaces of the interfitting portions 88. These second magnet cases 90 are mounted so as to be fitted over the second permanent magnets 87 with the crown portions 91 fitted onto the protruding portions 89. Here, the curved state of the pair of wing portions 92 is expanded so as to press the outer circumferential surfaces of the interfitting portions 88 by their own elastic force, and a predetermined clearance is ensured between the leading ends of the pair of wing portions 92. At least a central portion of the arc-shaped cross sections of each of the wing portions 92 are separated from the outer circumferential surfaces of the interfitting portions 88. Second magnet modules 93 are thereby assembled in which the second permanent magnets 87 are held inside the second magnet cases 90.

The interfitting portions 88 of the second magnet modules 93 that have been covered by the pair of wing portions 92 are inserted into the second magnet holding apertures 35 from an axial direction and held. Here, the curved state of the pair of wing portions 92 is expanded further in such a way that the gap between the leading ends of the pair of wing portions 92 is reduced, while the central portions of the arc-shaped cross sections are placed in close proximity to the outer circumferential surfaces of the interfitting portions 88, and the radius of curvature approaches the radius of curvature of the outer circumferential surfaces of the interfitting portions 88, increasing close-contact surface area of the second permanent magnets 80 with the outer circumferential surfaces of the interfitting portions 88. The second magnet modules 93 are thereby held in a press-fitted state in the second magnet holding apertures 35. At this point, the wing portions 92 are interposed between the second magnet holding apertures 35 and the interfitting portions 88 with their forces of recovery stored, and the second permanent magnets 87 are elastically supported in the second magnet holding apertures 35. The protruding portions 89 that have been covered by the crown portions 91 project outward through the second axial openings 36, and face the inner circumferential surfaces near the tip ends of the first claw-shaped magnetic pole portions 20.

The first and second permanent magnets 80 and 87 are magnetically oriented so as to have directions of magnetization 38 that are opposite to the orientation of a magnetic field 39 that the field current that flows through the field coil 14 produces in a plane that is perpendicular to a central axis of the rotor 13. In other words, if the magnetic field 39 is generated in the direction of the arrow as shown in FIG. 24 when an electric current is passed through the field coil 14, the first and second permanent magnets 80 and 87 are magnetically oriented in a reverse direction to the magnetic field 39. In this case, the directions of magnetization 38 of the first and second permanent magnets 80 and 87 are oriented radially, and extensions of the directions of magnetization 38 are directed at inner circumferential surfaces near the tip ends of the facing first and second claw-shaped magnetic pole portions 20 and 24. Moreover, in the case of a design in which the orientation of the magnetic field 39 that the field current that flows through the field coil 14 produces is inverted, the first and second permanent magnets 80 and 87 will also be magnetically oriented in a reverse direction.

Next, a method for manufacturing the first magnet cases 83 will explained with reference to FIGS. 26A through 26D. Here, a thin plate 100 is a stainless alloy flat plate that has a thickness of 0.5 to 2 mm, for example. A first metal mold 101 is prepared into a prismatic body that is constituted by: an arc-shaped base portion 102 that has a C-shaped cross section; and a lug portion 103 that has a trapezoidal cross section that protrudes radially outward integrally from a chord portion of the arc shape of the base portion 102. The lug portion 103 is formed so as to have an external shape that is similar to that of the protruding portions 82 of the first permanent magnets 80, and the base portion 102 is formed such that a radius of the arc shape has a slightly smaller diameter than the radii of the arc shapes of the interfitting portions 81. A press groove 105 that has an internal shape that is larger than an external shape of the first metal mold 101 from a center of the arc-shaped cross sectional shape of the base portion 102 to an upper end of the lug portion 103 by a distance approximately equal to the plate thickness of the thin plate 100 is recessed into a lower surface of a second metal mold 104. A pressing surface 107 that has an external shape that is similar to the external shape of the first metal mold 101 from the center of the arc-shaped cross sectional shape of the base portion 102 to the upper end of the lug portion 103 is formed on a leading end of a third metal mold 106. Pressing surfaces 109 that have internal shapes that are larger than an external shape of half of the base portion 102 from the centers of the arc-shaped cross sectional shapes to a first end on an opposite side from the lug portion 103 by a distance approximately equal to the plate thickness of the thin plate 100 are recessed into fourth metal molds 108.

First, as shown in FIG. 26A, the thin plate 100 is set in the second metal mold 104, and the thin plate 100 is pressed by the third metal mold 106. Thus, the thin plate 100 is pressed onto the pressing surface 107, and is flex molded into the groove shape of the press groove 105, and first and second ends of the thin plate 100 extend outward from the second metal mold 104 parallel to each other, as shown in FIG. 26B. Next, the third metal mold 106 is removed, and the first metal mold 101 is fitted inside the thin plate 100 that has been flex molded into the groove shape of the press groove 105, as shown in FIG. 26C. Thereafter, the portions of the thin plate 100 that project from the second metal mold 104 are pressed from right and left by the fourth metal molds 108, as shown in FIG. 26C. The portions of the thin plate 100 that project from the second metal mold 104 are thereby pressed onto the pressing surface 109, and are flex molded into the outer circumferential surface shape of the base portion 102 of the first metal mold 101. Next, the thin plate 100 is removed from the second metal mold 104 to obtain the first magnet case 83 that is shown in FIG. 26D.

As shown in FIG. 27, a pair of wing portions 85 of a first magnet case 83 that has been formed in this manner are pushed open, and a first permanent magnet 80 is inserted into the first magnet case 83. The opening force on the pair of wing portions 85 is subsequently removed, completing assembly of a first magnet module 86. At this point, the crown portion 84 is fitted onto the outer peripheral surface of the projecting portion 82 in a state of close contact. Because the radii of curvature of the inner circumferential surfaces of the wing portions 85 are slightly smaller than the radius of curvature of the outer circumferential surface of the interfitting portion 81, the wing portions 85 are expanded in a curved state, and are fitted onto the interfitting portion 81 in a compressed state by their own elastic force. The first permanent magnet 80 is thereby held in the first magnet case 83 and will not fall out.

Moreover, although not shown, the second magnet cases 90 are also prepared in a similar manner, and the second magnet modules 93 are also assembled in a similar manner.

Next, operation of an automotive alternator 202 that has been configured in this manner will be explained.

First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles.

At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

Next, operation of the magnetic flux will be explained with reference to FIGS. 28 and 29.

First, magnetic flux 40 is generated when an electric current is passed through the field coil 14. This magnetic flux 40 enters tooth portions of the stator core 11 by passing through the air gap 29 from the first claw-shaped magnetic pole portions 20. The magnetic flux 40 then moves circumferentially through a core back portion from the tooth portions of the stator core 11, and enters neighboring second claw-shaped magnetic pole portions 24 by passing through the air gap 29 from the tooth portions that face those second claw-shaped magnetic pole portions 24. Next, the magnetic flux 40 that has entered the second claw-shaped magnetic pole portions 24 passes through the second yoke portion 23, the second boss portion 22, the first boss portion 18, and the first yoke portion 19, and reaches the first claw-shaped magnetic pole portions 20. Now, in a conventional Lundell rotor, because the first and second pole core bodies are at their design limit, they are magnetically saturated by the magnetic field that is generated by the field coil, reducing magnetic flux that is generated by the rotor.

In Embodiment 7, the first and second permanent magnets 80 and 87 are magnetically oriented so as to be opposite to the orientation of the magnetic field 39 that is generated by the field coil 14. Thus, the orientation of the magnetic field that originates from the first and second permanent magnets 80 and 87 is in a reverse direction to the magnetic field 39 that is generated by the field coil 14. To interlink with the stator core 11, it is necessary for the magnetic flux 41 that originates from these first and second permanent magnets 80 and 87 to make a round trip across the air gap 29, which has a large magnetic resistance. The first and second permanent magnets 80 and 87 are disposed radially inside the second and first claw-shaped magnetic pole portions 24 and 20, and are disposed so as to circuit in a shorter magnetic path length than the inner circumferential surface sides of the first and second claw-shaped magnetic pole portions 20 and 24. Thus, a large portion of the magnetic flux 41 forms a closed magnetic circuit inside the rotor 13 without going around through the stator core 11.

In other words, the magnetic flux 41 that originates from the first permanent magnets 80 passes from the first magnet holding seats 30 through the first yoke portion 19, the first boss portion 18, the second boss portion 22, the second yoke portion 23, and the second claw-shaped magnetic pole portions 24, and returns to the first permanent magnets 80. The magnetic flux 41 that originates from the second permanent magnets 87 enters the first claw-shaped magnetic pole portions 20 through the gap, passes through the first yoke portion 19, the first boss portion 18, the second boss portion 22, the second yoke portion 23, and the second magnet holding seat 34, and returns to the second permanent magnets 87.

Thus, the magnetic flux 41 that originates from the first and second permanent magnets 80 and 87 is in a reverse direction from the magnetic flux 40 that originates from the field coil 14, enabling the magnetic flux density of the magnetic bodies that constitute the first and second pole core bodies 17 and 21 to be reduced significantly, thereby enabling magnetic saturation to be relieved.

According to Embodiment 7, because the first and second permanent magnets 80 and 87 are disposed, magnetic saturation is relieved and magnetic flux that interlinks with the stator 10 is increased, enabling generated power to be increased. In particular, generated power can be increased significantly in a low-speed idling region where magnetic saturation is pronounced.

Because the first and second permanent magnets 80 and 87 are disposed so as to face inner circumferential surfaces of the first and second claw-shaped magnetic pole portions 20 and 24, the first and second permanent magnets 80 and 87 are positioned radially inside an outermost circumferential surface of the rotor 13. Thus, stator slot harmonics are confined to outermost circumferential portions of the first and second claw-shaped magnetic pole portions 20 and 24, and do not act to heat the first and second permanent magnets 80 and 87 by direct induction. As a result, the first and second permanent magnets 80 and 87 are prevented from being heated and thermally demagnetized.

Because the first and second permanent magnets 80 and 87 are disposed so as to face the inner circumferential surfaces of the first and second claw-shaped magnetic pole portions 20 and 24, the magnetic circuits of the first and second permanent magnets 80 and 87 are closed magnetic circuits inside the rotor, eliminating magnetic flux components that interlink with the stator 10. Thus, the occurrence of voltages induced by the first and second permanent magnets 80 and 87 during no-load de-energization is suppressed. As a result, the magnet volume of the first and second permanent magnets 80 and 87 can be increased.

The first and second permanent magnets 80 and 87 are mounted onto the first and second yoke portions 19 and 23. Thus, because the first and second permanent magnets 80 and 87 are positioned radially inside the first and second claw-shaped magnetic pole portions 20 and 24, centrifugal forces that act on the first and second permanent magnets 80 and 87 are reduced, enabling the holding construction for the first and second permanent magnets 80 and 87 to be simplified. Because the first and second permanent magnets 80 and 87 are not affected by the first and second claw-shaped magnetic pole portions 20 and 24, which are displaced greatly relative to centrifugal force, holding of the first and second permanent magnets 80 and 87 is facilitated. Because of these facts, the holding reliability for the first and second permanent magnets 80 and 87 is improved.

Now, because the first and second pole core bodies 17 and 21 are prepared using a cold forging manufacturing method, high-precision magnet holding shapes are difficult to achieve.

Thus, in order to achieve high-precision magnet holding shapes, it has been necessary to apply milling to the first and second pole core bodies 17 and 21 that have been prepared by the cold forging manufacturing method using an NC milling machine, etc.

In Embodiment 7, because the aperture shapes of the first and second magnet holding apertures 31 and 35 for holding the magnets are tubular shapes that have C-shaped arc-shaped cross sections, first and second magnet holding apertures 31 and 35 that have high-precision aperture dimensions can be formed by applying simple and convenient additional milling using a rotary cutting tool such as a drill or a reamer, etc., to the first and second pole core bodies 17 and 21 that have been prepared by the cold forging manufacturing method. Thus, interfitting surfaces on the first and second magnet holding apertures 31 and 35 can be prepared by cutting using a rotary cutting tool, etc., making three-dimensional cutting processes that use NC milling machines, etc., unnecessary, enabling manufacturing time to be shortened and manufacturing costs to be reduced.

Because milling precision of the interfitting surfaces of the first and second magnet holding apertures 31 and 35 can be raised, the first and second magnet modules 86 and 93 into which the first and second permanent magnets 80 and 87 have been incorporated can be held firmly in the first and second magnet holding apertures 31 and 35 in a stable state without wobbling. Thus, even if the rotor 13 rotates at high speed, situations such as the first and second magnet modules 86 and 93 dislodging from the first and second magnet holding apertures 31 and 35 and being thrown and damaging the first and second permanent magnets 80 and 87 can be avoided.

Because the first and second permanent magnets 80 and 87 are incorporated into the first and second magnet cases 83 and 90, the occurrence of cracking and chipping of the first and second magnets 80 and 87 can be suppressed even if the automotive alternator 202 is subjected to vibrations from an automobile engine.

The first and second magnet holding apertures 31 and 35 are prepared into tubular shapes that have C-shaped arc-shaped cross sections so as to have aperture centers that are oriented axially, and the first and second magnet modules 86 and 93 are inserted into the first and second magnet holding apertures 31 and 35 from an axial direction and held. Thus, the holding construction of the first and second magnet modules 86 and 93 is simplified, and mountability is also improved, enabling reductions in production costs and improvements in mass producibility.

Because contact surfaces between the first and second magnet holding apertures 31 and 35 and the first and second magnet cases 83 and 90 are cylindrical surfaces, there are no local concentrations of stress, suppressing the occurrence of damage to the first and second magnet holding seats 30 and 34.

Because the first and second permanent magnets 80 and 87 are mounted into the first and second magnet holding apertures 31 and 35 by means of the nonmagnetic first and second magnet cases 83 and 90, magnetic leakage flux in which portions of the magnetic flux of the first and second permanent magnets 80 and 87 leak out to the first and second magnet holding seats 30 and 34 and then return to the first and second permanent magnets 80 and 87 is reduced. Thus, the amount of magnetic flux that is directed toward the facing second and first claw-shaped magnetic pole portions 24 and 20 from the first and second permanent magnets 80 and 87 increases, increasing magnet flux to rotor interior portions, and improving magnetic saturation alleviation effects.

Because the first and second magnet cases 83 and 90 are prepared by flex molding a stainless alloy flat plate, first and second magnet cases 83 and 90 that have shapes that conform to the complex external shapes of the first and second permanent magnets 80 and 87 can be prepared easily and inexpensively.

Use is made of the elastic force (the force of recovery) of the stainless alloy flat plate to fit the first and second magnet cases 83 and 90 onto the first and second permanent magnets 80 and 87, and gaps are left between the leading ends of the pairs of wing portions 85 and 92. Thus, machining errors in the first and second permanent magnets 80 and 87 and the first and second magnet cases 83 and 90 are absorbed, enabling the first and second magnet cases 83 and 90 to be fitted onto the first and second permanent magnets 80 and 87 easily. In addition, dimensional errors between the first and second magnet modules 86 and 93 and the first and second magnet holding apertures 31 and 35 can be absorbed by the elastic force of the first and second magnet cases 83 and 90, suppressing the occurrence of poor fitting together of the two, and also enabling the first and second magnet modules 86 and 93 to be held in the first and second magnet holding apertures 31 and 35 without wobbling.

Because the first magnet modules 86 are held in all eight first magnet holding seats 30 that are disposed so as to protrude from portions of the first yoke portion 19 between circumferentially-adjacent first claw-shaped magnetic pole portions 20, and the second magnet modules 93 are held in all eight second magnet holding seats 34 that are disposed so as to protrude from portions of the second yoke portion 23 between circumferentially-adjacent second claw-shaped magnetic pole portions 24, the first and second magnet modules 86 and 93 are arranged at a uniform angular pitch. Thus, the sum total of vectors from the center of the shaft 16 to the magnet center of gravity of each of the first and second magnet modules 86 and 93 is a zero vector, suppressing the occurrence of gravimetric imbalances relative to centrifugal forces that result from disposing the first and second permanent magnets 80 and 87. Here, the magnet center of gravity is a center of gravity of a first magnet module 86 that includes a first permanent magnet 80 and a first magnet case 83, and a center of gravity of a second magnet module 93 that includes a second permanent magnet 87 and a second magnet case 90.

Moreover, in Embodiment 7 above, the protruding portions 82 and 89 of the first and second permanent magnets 80 and 87 are formed so as to have trapezoidal cross sections, but the cross sections of the protruding portions are not limited to a trapezoidal shape. Since magnet manufacturing is facilitated, it is particularly preferable that the cross sections be quadrilaterals of trapezoidal, square, or rectangular shape. In addition, chamfering or rounding may also be applied to corner portions of the quadrilateral cross sections. The shapes of the crown portions 84 and 91 of the first and second magnet cases 83 and 90 will be formed so as to conform to the external shape of the projecting portions 82 and 89 of the first and second permanent magnets 80 and 87.

In Embodiment 7 above, the first and second permanent magnets 80 and 87 are elastically supported in the first and second magnet holding apertures 31 and 35 by the first and second magnet cases 83 and 90, but the first and second permanent magnets 80 and 87 may also be additionally fixed to the first and second magnet holding apertures 31 and 35 using an adhesive.

In Embodiment 7 above, the first and second magnet modules 86 and 93 are disposed in all of the first and second magnet holding seats 30 and 34, but it is not necessary for the first and second magnet modules 86 and 93 to be disposed in all of the first and second magnet holding seats 30 and 34, and the number of first and second magnet modules 86 and 93 that is disposed should be selected appropriately taking into account required performance and costs. In that case, in order not to generate gravimetric imbalances with respect to centrifugal forces, the first and second magnet modules 86 and 93 should be disposed such that the sum total of vectors from the center of the shaft 16 to the magnet center of gravity of each of the first and second magnet modules 86 and 93 is a zero vector.

For example, since the number of the first and second magnet holding seats 30 and 34 is eight, if required performance and costs are taken into account and it is decided that the number of each of the first and second magnet modules 86 and 93 to be disposed is six, then six first and second magnet modules 86 and 93 should be disposed in the first and second magnet holding seats 30 and 34 at positions that form point symmetry with respect to the center of the shaft 16, in other words, excluding two first and second magnet holding seats 30 and 34 at positions that are separated by 180 degrees circumferentially. In this manner, the sum total of vectors from the center of the shaft 16 to the magnet center of gravity of each of the first and second magnet modules 86 and 93 will be a zero vector. If it is decided that the number of each of the first and second magnet modules 86 and 93 to be disposed is four, then the first and second magnet modules 86 and 93 should respectively be disposed in first and second magnet holding seats 30 and 34 at a uniform angular pitch of 90 degrees. In this manner, the sum total of vectors from the center of the shaft 16 to the magnet center of gravity of each of the first and second magnet modules 86 and 93 will also be a zero vector.

In Embodiment 7 above, the first and second magnet holding seats 30 and 34 that hold the first and second magnet modules 86 and 93 are disposed between all of the circumferentially-adjacent first and second claw-shaped magnetic pole portions 20 and 24, but it is not necessary for the first and second magnet holding seats 30 and 34 that hold the first and second magnet modules 86 and 93 to be disposed between all of the circumferentially-adjacent first and second claw-shaped magnetic pole portions 20 and 24, and the number of first and second magnet holding seats 30 and 34 that is disposed should be selected appropriately taking into account required performance and costs. In that case, in order not to generate gravimetric imbalances with respect to centrifugal forces, the first and second magnet holding seats 30 and 34 should be disposed such that the sum total of vectors from the center of the shaft 16 to the magnet holding seat overall center of gravity of each of the first and second magnet holding seats 30 and 34 that hold the first and second magnet modules 86 and 93 is a zero vector. Here, the magnet holding seat overall center of gravity is a center of gravity that includes a first magnet holding seat 30, a first permanent magnet 80, and a first magnet case 83, and a center of gravity that includes a second magnet holding seat 34, a second permanent magnet 87, and a second magnet case 90.

For example, if required performance and costs are taken into account and it is decided that the number of each of the first and second magnet holding seats 30 and 34 that hold the first and second magnet modules 86 and 93 to be disposed is six, then the first and second magnet holding seats 30 and 34 should be disposed at positions that form point symmetry with respect to the center of the shaft 16, in other words, at six positions excluding two positions that are separated by 180 degrees circumferentially, and the first and second magnet modules 86 and 93 should be disposed in the respective first and second magnet holding seats 30 and 34. In this manner, the sum total of vectors from the center of the shaft 16 to the magnet holding seat overall center of gravity of each of the first and second magnet holding seats 30 and 34 will be a zero vector. If it is decided that the number of each of the first and second magnet holding seats 30 and 34 that hold the first and second magnet modules 86 and 93 to be disposed is four, then the four first and second magnet holding seats 30 and 34 should respectively be disposed at a uniform angular pitch of 90 degrees, and the first and second magnet modules 86 and 93 should be disposed in the respective first and second magnet holding seats 30 and 34. In this manner, the sum total of vectors from the center of the shaft 16 to the magnet holding seat overall center of gravity of each of the first and second magnet holding seats 30 and 34 will also be a zero vector.

Thus, even if the disposed number of first and second magnet modules 86 and 93 changes, because the magnetic flux from the first and second permanent magnets 80 and 87 is magnetically closed inside the rotor, magnetic imbalances will also not arise with respect to the stator.

Embodiment 8

Figure 30:
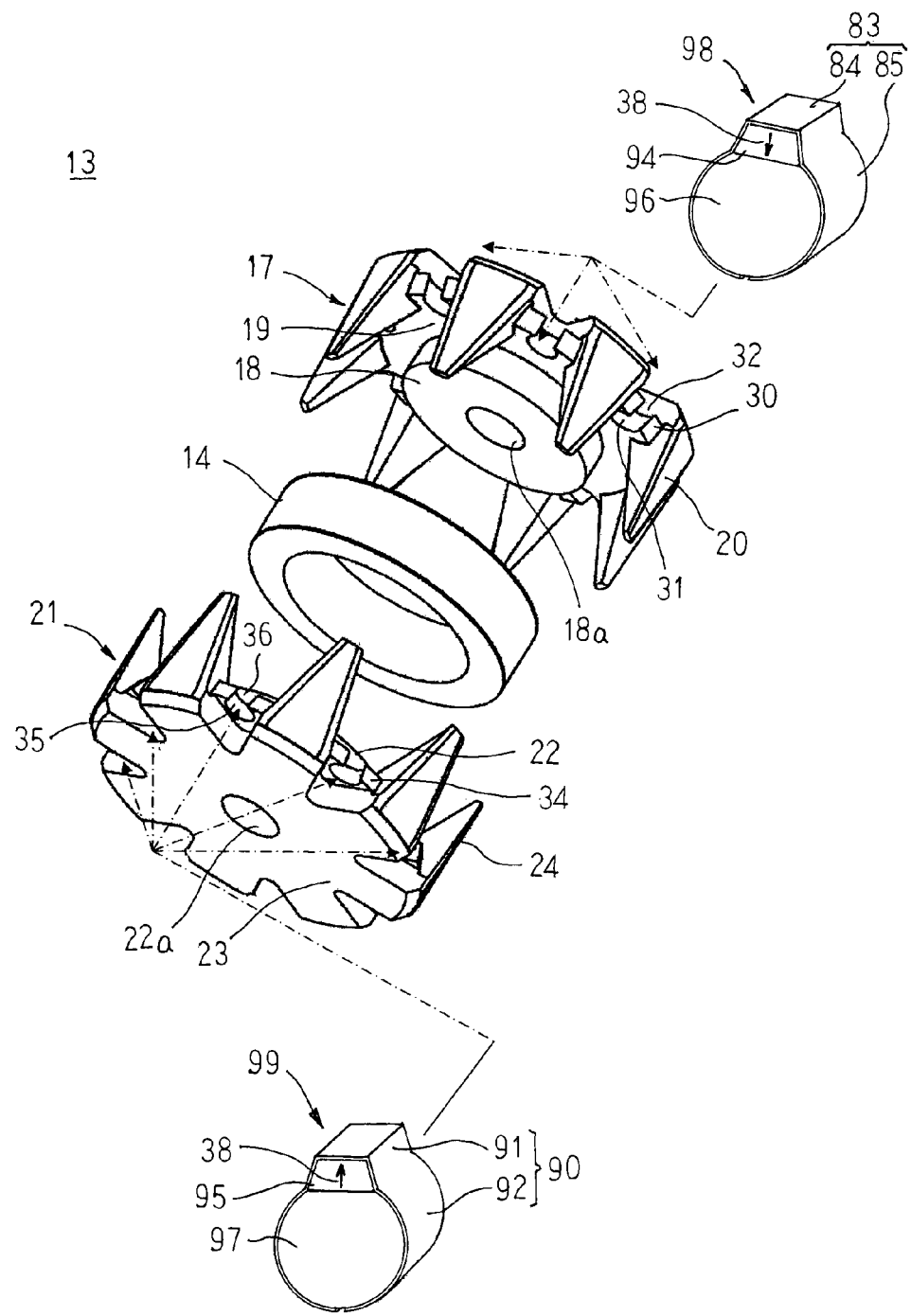
FIG. 30 is an exploded perspective of a rotor that can be used in an automotive alternator according to Embodiment 8 of the present invention.
Figure 31:
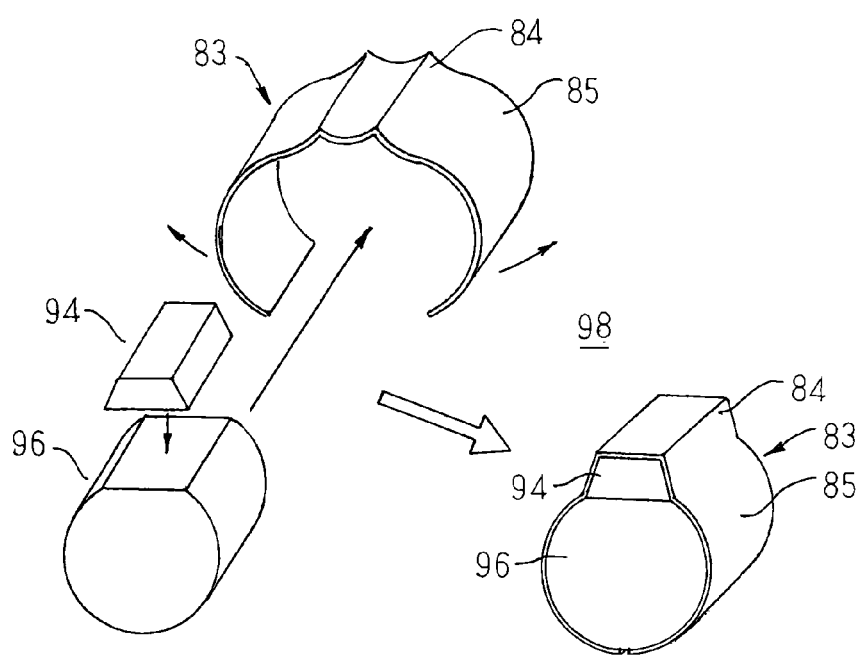
FIG. 31 is a diagram that explains a method for mounting a permanent magnet into a magnet case in the automotive alternator according to Embodiment 8 of the present invention.

FIG. 30 is an exploded perspective of a rotor that can be used in an automotive alternator according to Embodiment 8 of the present invention, and FIG. 31 is a diagram that explains a method for mounting a permanent magnet into a magnet case in the automotive alternator according to Embodiment 8 of the present invention.

In Embodiment 8, first and second permanent magnets 94 and 95 are prepared into prismatic bodies that have external shapes that are similar to those of the projecting portions 82 and 89 in above Embodiment 7, in other words, trapezoidal cross sections. First and second interfitting members 96 and 97 that function as a magnet holding member are prepared into prismatic bodies that have external shapes that are similar to those of the interfitting portions 81 and 88 in Embodiment 7 above, in other words, that form arc shapes that have C-shaped cross sections, using a magnetic material such as iron, etc. First and second magnet modules 98 and 99 are assembled by mounting the first and second permanent magnets 94 and 95 into first and second magnet cases 83 and 90 that function as a magnet holding member by abutting bottom surfaces of the trapezoidal cross sections to flat surfaces that are constituted by chord portions of the arc-shaped cross sectional shapes of the first and second interfitting members 96 and 97.

The first and second interfitting members 96 and 97 of the first and second magnet modules 98 and 99 that have been covered by pairs of wing portions 85 and 92 are inserted into the first and second magnet holding apertures 31 and 35 from an axial direction and held. Here, the curved state of the pairs of wing portions 85 and 92 is expanded further in such a way that the gaps between the leading ends of the pairs of wing portions 85 and 92 are reduced, while the radius of curvature approaches the radius of curvature of the outer circumferential surfaces of the first and second interfitting members 96 and 97, bringing them into close contact with the outer circumferential surfaces of the first and second interfitting members 96 and 97. The first and second magnet modules 98 and 99 are thereby press-fitted into and held by the first and second magnet holding apertures 31 and 35. The wing portions 85 and 92 are interposed between the first and second magnet holding apertures 31 and 35 and the first and second interfitting members 96 and 97 with their forces of recovery stored, and the first and second interfitting members 96 and 97 are elastically supported in the first and second magnet holding apertures 31 and 35. The first and second permanent magnets 94 and 95 that have been covered by crown portions 84 and 91 project outward through first and second axial openings 32 and 36, and face inner circumferential surfaces near tip ends of second and first claw-shaped magnetic pole portions 24 and 20.

The first and second permanent magnets 94 and 95 are magnetically oriented so as to have directions of magnetization 38 that are opposite to the orientation of a magnetic field 39 that the field current that flows through the field coil 14 produces in a plane that is perpendicular to a central axis of the rotor 13.

Moreover, the rest of this embodiment is configured in a similar manner to Embodiment 7 above.

Consequently, similar effects to those in Embodiment 7 above can also be achieved in Embodiment 8.

Because the first and second interfitting members 96 and 97 are prepared using a magnetic material, magnetic resistance between the first and second permanent magnets 94 and 95 and the first and second magnet holding seats 30 and 34 is reduced. Thus, increases in magnetic resistance in the magnet magnetic path that result from use of the first and second permanent magnets 94 and 95 that have been prepared into prismatic bodies that have trapezoidal cross sections instead of the first and second permanent magnets 80 and 87 from Embodiment 7 above are suppressed, suppressing reductions in rotor magnetic saturation alleviation effects.

According to Embodiment 8, because the first and second permanent magnets 94 and 95 are prepared into prismatic bodies that have trapezoidal cross sections, the magnets are easy to produce, enabling yield to be raised.

With anisotropic sintered magnets in particular, sintered bodies are formed by pressing magnet powder under high pressure in a press while orienting the magnetic field. Thus, the pressure that acts on the magnet powder inside the press die is more uniform if facing sides are parallel flat surfaces, enabling high-density magnets to be produced. When the sintered bodies are finished to a desired external shape by applying abrasive wheel machining to sintered bodies that have been obtained in this manner, and then magnets are cut out in a desired shape, material yield is increased if the magnet shape has a trapezoidal cross section. Here, because magnets that have trapezoidal cross sections can be cut out so as to make the cutting surfaces perpendicular to a plane of orientation, productivity can be increased, and manufacturing costs can also be reduced.

In Embodiment 8 above, the first and second permanent magnets 94 and 95 are formed so as to have trapezoidal cross sections, but the cross sections of the magnets are not limited to a trapezoidal shape, and the cross sections may also be quadrilaterals of square or rectangular shape. In addition, chamfering or rounding may also be applied to corner portions of the quadrilateral cross sections. The shapes of the crown portions 84 and 91 of the first and second magnet cases 83 and 90 will be formed so as to conform to the external shape of the first and second permanent magnets 94 and 95.

In Embodiment 8 above, because the first magnet modules 98 are held in all eight first magnet holding seats 30 that are disposed so as to protrude from portions of the first yoke portion 19 between circumferentially-adjacent first claw-shaped magnetic pole portions 20, and the second magnet modules 99 are held in all eight second magnet holding seats 34 that are disposed so as to protrude from portions of the second yoke portion 23 between circumferentially-adjacent second claw-shaped magnetic pole portions 24, the first and second magnet modules 98 and 99 are arranged at a uniform angular pitch. Thus, the sum total of vectors from the center of the shaft 16 to the magnet center of gravity of each of the first and second magnet modules 98 and 99 is a zero vector, suppressing the occurrence of gravimetric imbalances relative to centrifugal forces that result from disposing the first and second permanent magnets 94 and 95. Here, the magnet center of gravity is a center of gravity of a first magnet module 98 that includes a first permanent magnet 94, a first interfitting member 96, and a first magnet case 83, and a center of gravity of a second magnet module 99 that includes a second permanent magnet 95, a second interfitting member 97, and a second magnet case 90.

In Embodiment 8 above, the first and second magnet modules 98 and 99 are disposed in all of the first and second magnet holding seats 30 and 34, but it is not necessary for the first and second magnet modules 98 and 99 to be disposed in all of the first and second magnet holding seats 30 and 34, and the number of first and second magnet modules 98 and 99 that is disposed should be selected appropriately taking into account required performance and costs. In that case, in order not to generate gravimetric imbalances with respect to centrifugal forces, the first and second magnet modules 98 and 99 should be disposed such that the sum total of vectors from the center of the shaft 16 to the magnet center of gravity of each of the first and second magnet modules 98 and 99 is a zero vector.

Figure 32:
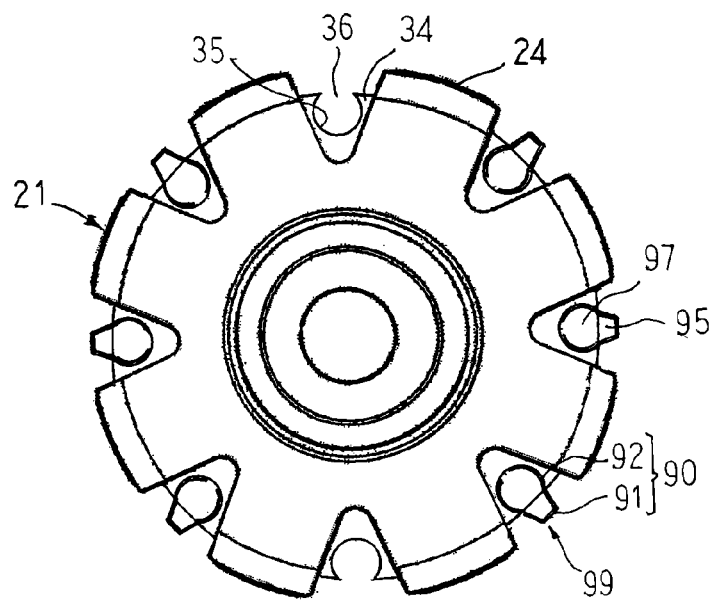
FIG. 32 is an end elevation of a rotor that shows a first preferred variation of the automotive alternator according to Embodiment 8 of the present invention.

For example, if required performance and costs are taken into account and it is decided that the number of each of the first and second magnet modules 98 and 99 to be disposed is six, then six first and second magnet modules 98 and 99 should be disposed in the first and second magnet holding seats 30 and 34 at positions that form point symmetry with respect to the center of the shaft 16, as shown in FIG. 32, in other words, excluding two first and second magnet holding seats 30 and 34 at positions that are separated by 180 degrees circumferentially. In this manner, the sum total of vectors from the center of the shaft 16 to the magnet center of gravity of each of the first and second magnet modules 98 and 99 will be a zero vector. If it is decided that the number of each of the first and second magnet modules 98 and 99 to be disposed is four, then the first and second magnet modules 98 and 99 should respectively be disposed in first and second magnet holding seats 30 and 34 at a uniform angular pitch of 90 degrees. In this manner, the sum total of vectors from the center of the shaft 16 to the magnet center of gravity of each of the first and second magnet modules 98 and 99 will also be a zero vector.

In Embodiment 8 above, the first and second magnet holding seats 30 and 34 that hold the first and second magnet modules 98 and 99 are disposed between all of the circumferentially-adjacent first and second claw-shaped magnetic pole portions 20 and 24, but it is not necessary for the first and second magnet holding seats 30 and 34 that hold the first and second magnet modules 98 and 99 to be disposed between all of the circumferentially-adjacent first and second claw-shaped magnetic pole portions 20 and 24, and the number of first and second magnet holding seats 30 and 34 that is disposed should be selected appropriately taking into account required performance and costs. In that case, in order not to generate gravimetric imbalances with respect to centrifugal forces, the first and second magnet holding seats 30 and 34 should be disposed such that the sum total of vectors from the center of the shaft 16 to the magnet holding seat overall center of gravity of each of the first and second magnet holding seats 30 and 34 that hold the first and second magnet modules 98 and 99 is a zero vector. Here, the magnet holding seat overall center of gravity is a center of gravity that includes a first magnet holding seat 30, a first permanent magnet 94, a first interfitting member 96, and a first magnet case 83, and a center of gravity that includes a second magnet holding seat 34, a second permanent magnet 95, a second interfitting member 97, and a second magnet case 90.

Figure 33:
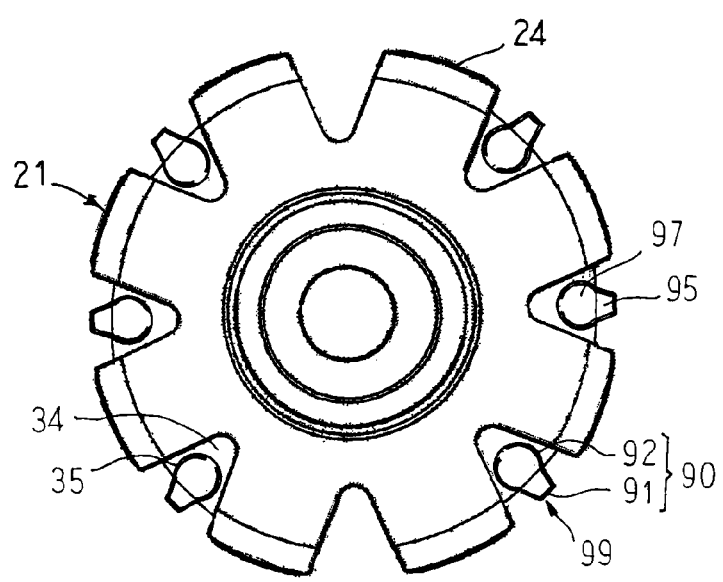
FIG. 33 is an end elevation of a rotor that shows a second preferred variation of the automotive alternator according to Embodiment 8 of the present invention.

For example, if required performance and costs are taken into account and it is decided that the number of each of the first and second magnet holding seats 30 and 34 that hold the first and second magnet modules 98 and 99 to be disposed is six, then the first and second magnet holding seats 30 and 34 should be disposed at positions that form point symmetry with respect to the center of the shaft 16, as shown in FIG. 33, in other words, at six positions excluding two positions that are separated by 180 degrees circumferentially, and the first and second magnet modules 98 and 99 should be disposed in the respective first and second magnet holding seats 30 and 34. In this manner, the sum total of vectors from the center of the shaft 16 to the magnet holding seat overall center of gravity of each of the first and second magnet holding seats 30 and 34 will be a zero vector. If it is decided that the number of each of the first and second magnet holding seats 30 and 34 that hold the first and second magnet modules 98 and 99 to be disposed is four, then the four first and second magnet holding seats 30 and 34 should respectively be disposed at a uniform angular pitch of 90 degrees, and the first and second magnet modules 98 and 99 should be disposed in the respective first and second magnet holding seats 30 and 34. In this manner, the sum total of vectors from the center of the shaft 16 to the magnet holding seat overall center of gravity of each of the first and second magnet holding seats 30 and 34 will also be a zero vector.

Thus, even if the disposed number of first and second magnet modules 98 and 99 changes, because the magnetic flux from the first and second permanent magnets 94 and 95 is magnetically closed inside the rotor, magnetic imbalances will also not arise with respect to the stator.

In Embodiments 7 and 8 above, magnet case are prepared by press-forming stainless alloy flat plates, but the magnet cases are not limited to a stainless alloy provided that they have enough fitting force (elastic force) to be able to hold the permanent magnets, and metals such as iron, etc., or plastics can be used, for example. In order to reduce magnetic leakage flux in particular, in which portions of the magnetic flux from the magnets leaks to the magnet holding seats and then returns to the permanent magnets, it is preferable to make the material for the magnet cases a nonmagnetic material.

In Embodiments 7 and 8 above, the first and second magnet holding apertures 31 and 35 are formed on the first and second magnet holding seats 30 and 34 so as to pass through from a first axial end to a second axial end so as to have aperture centers that are oriented axially, and so as to have arc shapes that have C-shaped cross sections that open radially outward, but the first and second magnet holding apertures do not necessarily have to pass through from the first axial end to the second end, provided that at least one of the first axial end or the second end is open.

It is not absolutely necessary to orient the aperture centers of the first and second magnet holding apertures axially, and they may also be inclined relative to an axial direction. For example, it is more preferable if aperture centers of first and second magnet holding apertures are made approximately parallel to inner circumferential surfaces near tip ends of facing second and first claw-shaped magnetic pole portions.

Moreover, in each of the above embodiments, explanations are given for automotive alternators, but the present invention is not limited to automotive alternators, and similar effects are also exhibited if the present invention is applied to other dynamoelectric machines such as automotive electric motors, automotive generator-motors, etc.

In each of the above embodiments, materials for the first and second permanent magnets have not been explained, but large spaces cannot be ensured for disposing the permanent magnets due to the Lundell rotor construction. Thus, in order to achieve sufficient magnetic saturation alleviation effects using small-volume magnets, it is preferable to use anisotropic sintered rare-earth magnets that have an energy product BHmax that is greater than 30 MGOe.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A dynamoelectric machine comprising:
  a rotor having:
    a pole core having:
      a boss portion;
      a pair of yoke portions that are disposed so as to extend radially outward from two axial end edge portions of said boss portion; and
      a plurality of claw-shaped magnetic pole portions that are disposed so as to extend axially alternately from each of said pair of yoke portions, and that are arranged circumferentially so as to intermesh with each other,
      said pole core being fixed to a shaft that is inserted through a center axial portion of said boss portion; and
    a field coil that is housed inside a space that is surrounded by said boss portion, said pair of yoke portions, and said plurality of claw-shaped magnetic pole portions,
  said dynamoelectric machine comprising:
  a permanent magnet holding portion that is disposed integrally so as to project from said yoke portion, said permanent magnet holding portion facing an inner circumferential surface near a tip end of said claw-shaped magnetic pole portion;
  an arc-shaped magnet holding aperture that has a C-shaped cross section that is formed in said permanent magnet holding portion so as to have an aperture center that is oriented axially, in which at least one axial end is open, and that opens radially outward;
  a magnet holding member that is made of a nonmagnetic material that is fitted into and held by said magnet holding aperture; and
  a permanent magnet that is held by said magnet holding member so as to face said inner circumferential surface near said tip end of said claw-shaped magnetic pole portions, that is prepared into a prismatic body that has a quadrilateral cross section perpendicular to an axial direction, and that is magnetically oriented in a reverse direction to an orientation of a magnetic field produced by said field coil.

2. A dynamoelectric machine according to claim 1, wherein:
  said magnet holding member is a resin body that has been prepared into a columnar body that has an outer circumferential surface shape that conforms to an inner circumferential surface shape of said magnet holding aperture; and
  said permanent magnet is molded integrally into said resin body so as to protrude out of said resin body, a portion of said permanent magnet that protrudes out of said resin body extending radially outward from said magnet holding aperture.

3. A dynamoelectric machine according to claim 2, wherein said portion of said permanent magnet that protrudes out of said resin body is formed so as to have a flat surface that is approximately parallel to said inner circumferential surface near said tip end of said claw-shaped magnetic pole portions.

4. A dynamoelectric machine according to claim 2, wherein a magnetic body that has an arc-shaped cross section is molded integrally into said resin body so as to be joined to a radially-inner wall surface of said permanent magnet such that said arc-shaped cross section is oriented radially inward.

5. A dynamoelectric machine according to claim 1, wherein:
said magnet holding member is a magnet holder that is made of a magnetic material, said magnet holder comprising:
an arc-shaped intermitting portion that has a C-shaped cross section that is inserted into and held by said magnet holding aperture;
a protruding portion that has a quadrilateral cross section that is disposed integrally so as to project radially outward from said interfitting portion and protrude radially outward from said magnet holding aperture; and
a magnet mounting aperture that has a quadrilateral cross section that passes through said protruding portion and said interfitting portion from a first axial end to a second axial end; and
said permanent magnet is inserted into said magnet mounting aperture and held by said magnet holder.

6. A dynamoelectric machine according to claim 5, wherein said magnet holder is prepared by laminating and integrating a predetermined number of thin magnetic plates that have an external shape in which a quadrilateral protrudes radially outward from a chord portion of a C-shaped arc shape, and in which aperture portions that constitute said magnet mounting aperture are formed.

7. A dynamoelectric machine according to claim 5, wherein:
said permanent magnet holding portions are disposed so as to project from portions of said pair of yoke portions that face said inner circumferential surface near said tip end of all of said claw-shaped magnetic pole portions; and
said magnet holders into which said permanent magnets have been inserted and held by said magnet mounting apertures are disposed such that a sum total of vectors from a center of said shaft to a center of gravity of each of said magnet holders that includes said permanent magnet is a zero vector.

8. A dynamoelectric machine according to claim 5, wherein:
said magnet holders into which said permanent magnets have been inserted and held by said magnet mounting apertures are inserted into and held by said magnet holding apertures of all of said permanent magnet holding portions; and
said permanent magnet holding portions in which said magnet holders are held are disposed such that a sum total of vectors from a center of said shaft to a center of gravity of each of said permanent magnet holding portions that includes said permanent magnet and said magnet holder is a zero vector.

9. A method for manufacturing a dynamoelectric machine according to claim 5, said method for manufacturing a dynamoelectric machine comprising steps of:

inserting and holding an unmagnetized permanent magnet in said magnet mounting aperture of said magnet holder;
magnetizing said unmagnetized permanent magnet by applying a magnetic field to said magnet holder in which said unmagnetized permanent magnet is held; and
inserting and holding said magnet holder in which said magnetized permanent magnet is held in said magnet holding aperture.

10. A dynamoelectric machine according to claim 1, wherein said magnet holding member comprising:
an interfitting member that is made of a magnetic material that is prepared into an arc-shaped prismatic body that has a C-shaped cross section, and that is housed in said magnet holding aperture; and
a magnet case that has:
a crown portion that has a shape that covers an outer peripheral surface of said permanent magnet that is disposed so as to protrude out of an opening of said magnet holding aperture on a plane that is constituted by a chord portion of said arc shape of said interfitting member; and
a pair of wing portions that have arc-shaped cross sections that extend outward from two ends of said crown portion in a shape that covers an outer peripheral surface of said interfitting member, and that have radii of curvature that are smaller than a radius of curvature of said outer peripheral surface of said interfitting member,
said magnet case being interposed between said magnet holding aperture and said interfitting member such that said crown portion is fitted over said permanent magnet, and curved states of said arc-shaped cross sections of said pair of wing portions are expanded so as to store forces of recovery.

11. A dynamoelectric machine according to claim 10, wherein said magnet case is prepared by flex molding a thin metal plate.

12. A dynamoelectric machine according to claim 10, wherein said magnet case is prepared using a nonmagnetic material.

13. A dynamoelectric machine according to claim 10, wherein:
said permanent magnet holding portions are disposed so as to project from portions of said pair of yoke portions that face said inner circumferential surface near said tip end of all of said claw-shaped magnetic pole portions; and
said permanent magnets that are held in said magnet holding apertures are disposed such that a sum total of vectors from a center of said shaft to a center of gravity of each of said permanent magnets that includes said magnet case or said interfitting member and said magnet case is a zero vector.

14. A dynamoelectric machine according to claim 10, wherein:
said permanent magnets are held in all of said permanent magnet holding portions; and
said permanent magnet holding portions in which said permanent magnets are held are disposed such that a sum total of vectors from a center of said shaft to a permanent magnet holding portion overall center of gravity of each of said permanent magnet holding portions in which said permanent magnets are held is a zero vector.

* * * * *